(12) United States Patent
Suzuki et al.

(10) Patent No.: US 11,520,536 B2
(45) Date of Patent: Dec. 6, 2022

(54) INFORMATION PROCESSING APPARATUS, CONTROL METHOD AND PROGRAM THEREFOR, AND SERVER SYSTEM CAPABLE OF COMMUNICATING WITH THE INFORMATION PROCESSING APPARATUS

(71) Applicant: CANON KABUSHIKI KAISHA, Tokyo (JP)

(72) Inventors: Shinya Suzuki, Chiba (JP); Hirokazu Saigusa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/157,723

(22) Filed: Jan. 25, 2021

(65) Prior Publication Data

US 2021/0240407 A1 Aug. 5, 2021

(30) Foreign Application Priority Data

Jan. 31, 2020 (JP) .............................. JP2020-015842
Oct. 21, 2020 (JP) .............................. JP2020-176781
Jan. 14, 2021 (JP) .............................. JP2021-004373

(51) Int. Cl.
*G06F 3/12* (2006.01)
*H04L 67/10* (2022.01)

(52) U.S. Cl.
CPC .......... *G06F 3/1206* (2013.01); *G06F 3/1226* (2013.01); *G06F 3/1247* (2013.01); *G06F 3/1253* (2013.01); *G06F 3/1288* (2013.01); *G06F 3/1293* (2013.01); *G06F 3/1204* (2013.01); *H04L 67/10* (2013.01)

(58) Field of Classification Search
CPC .... G06F 3/1206; G06F 3/1293; G06F 3/1253; G06F 3/1288; G06F 3/1228; G06F 3/1226; G06F 3/1247; G06F 3/1225; G06F 3/1237; G06F 3/1254; G06F 3/1285; G06F 3/122; G06F 3/1272; G06F 3/1287; G06F 3/1297; G06F 3/1204; H04L 67/10
USPC ........................................................ 358/1.15
See application file for complete search history.

(56) References Cited

U.S. PATENT DOCUMENTS

| | | | |
|---|---|---|---|
| 2012/0268778 A1* | 10/2012 | Nakawaki | G06F 3/122 |
| | | | 358/1.15 |
| 2017/0220304 A1* | 8/2017 | Ando | G06F 3/1248 |
| 2017/0269882 A1* | 9/2017 | Hasegawa | G06F 9/445 |

FOREIGN PATENT DOCUMENTS

JP  2013-238924 A  11/2013

* cited by examiner

*Primary Examiner* — Darryl V Dottin
(74) *Attorney, Agent, or Firm* — Canon U.S.A., Inc. IP Division

(57) ABSTRACT

An information processing apparatus communicating with a server system capable of converting received print data into print data conforming to a print apparatus used for printing the received print data and transmits the converted print data to the printing apparatus, the information processing apparatus includes a generation unit configured to generate print data conforming to the print apparatus used for printing, a transmission unit configured to transmit the print data generated by the generation unit to the server system, and an instruction unit configured to instruct the server system to transmit the received print data to the print apparatus without converting the received print data.

12 Claims, 21 Drawing Sheets

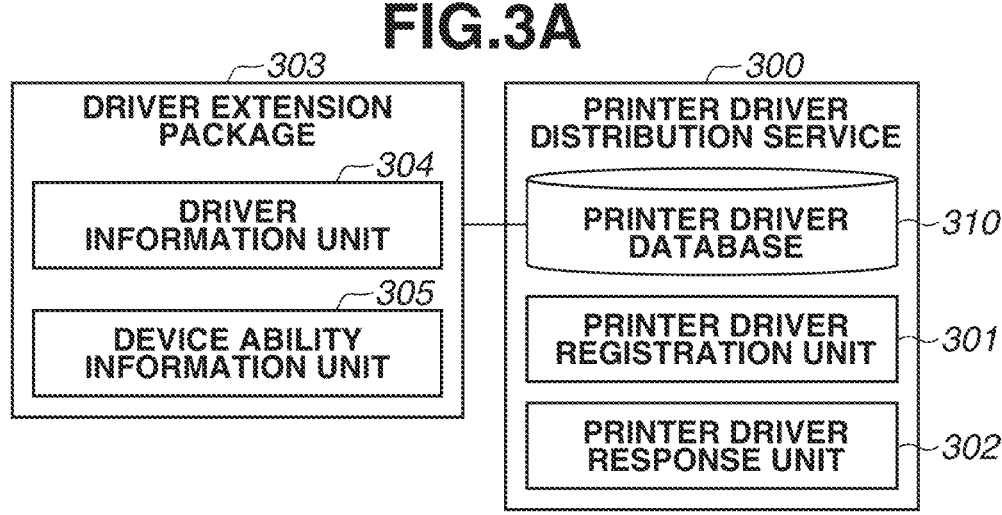
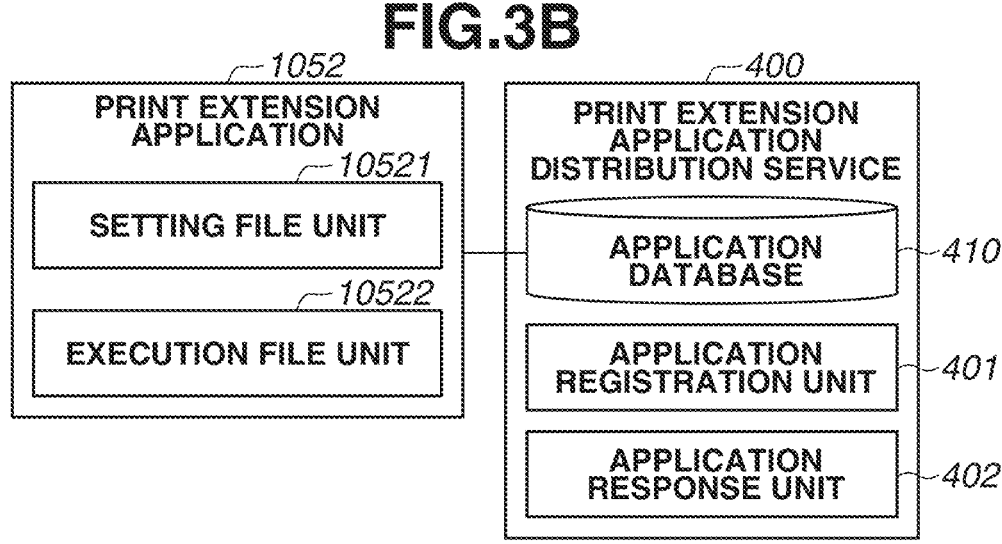
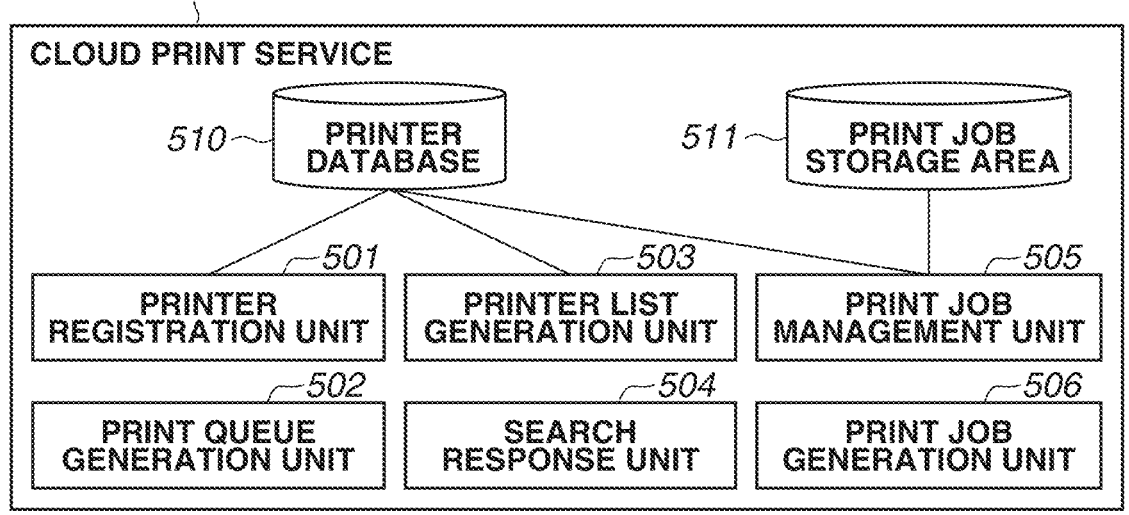

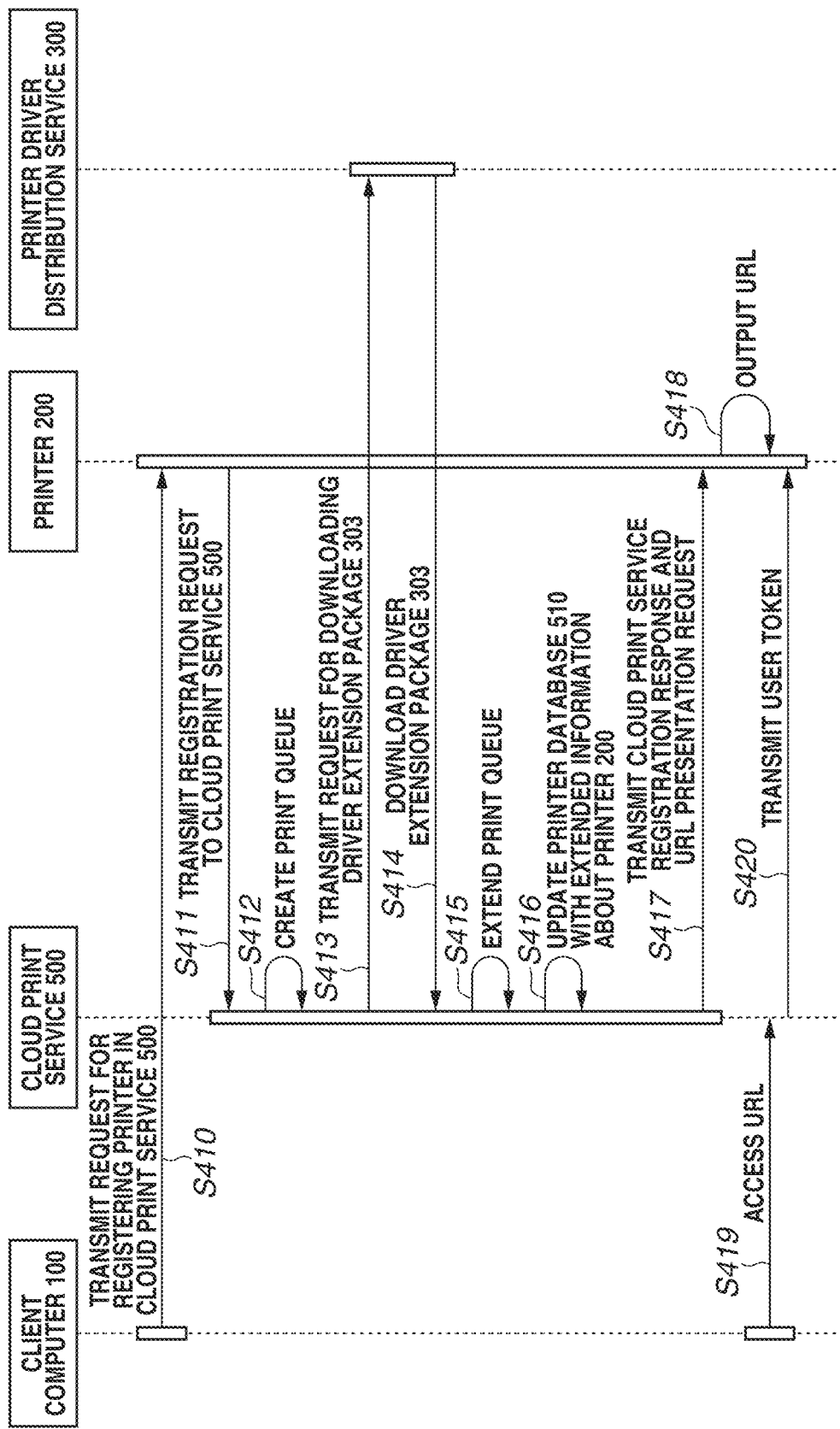

FIG.5A

| DEVICE NAME | HWID | COID | IP ADDRESS | PACKAGE |
|---|---|---|---|---|
| iR-ADV CCCC | iR-ADV_CCCC61B1 | xxyyzz | xxx.xxx.xxx.001 | package C |
| iR-ADV XXXX | iR-ADV_XXXXD80D | xxyyzz | xxx.xxx.xxx.111 | package D |
| AAAA | AAAACF39 | aaabbb | xxx.xxx.xxx.222 | null |
| YYYY | YYYY62B5 | abcabc | xxx.xxx.xxx.234 | null |

FIG.5B

| PACKAGE NAME | HWID | COID | PACKAGE | APPLICATION IDENTIFIER | EXTENSION |
|---|---|---|---|---|---|
| A-Driver | iR-ADV_CCCC61B2 | xxyyzz | package A | | FALSE |
| B-Driver | iR-ADV_XXXXD81D | xxyyzz | package B | | FALSE |
| C-Driver | iR-ADV_CCCC61B1 | xxyyzz | package C | AAAAA_AA | TRUE |
| D-Driver | iR-ADV_XXXXD80D | xxyyzz | package D | BBBBB_BB | TRUE |

FIG.5C

| APPLICATION NAME | APPLICATION IDENTIFIER | APPLICATION PACKAGE |
|---|---|---|
| A-company App | AAAAA_AA | package AA |
| B-company App | BBBBB_BB | package BB |
| C-company App | CCCCC_CC | package CC |
| D-company App | DDDDD_DD | pakcage DD |

FIG.7

CLOUD PRINT SERVICE

Taro Yamada | UPDATE | NUMBER OF DOCUMENTS: 5

| DOCUMENT NAME | COLOR MODE | DUPLEX | N-IN-ONE PRINTING | NUMBER OF COPIES | DATE/TIME |
|---|---|---|---|---|---|
| ■ aaa.doc | COLOR | ONE-SIDED | 1in1 | 1 COPY | 01/14 10:19 |
| ☐ ddd.doc | BLACK-AND-WHITE | ONE-SIDED | 1in1 | 5 COPIES | 01/14 10:19 |
| ☐ eee.pdf | BLACK-AND-WHITE | DUPLEX | 1in1 | 1 COPY | 01/14 10:19 |
| ☐ hhh.doc | COLOR | ONE-SIDED | 1in1 | 1 COPY | 01/14 10:20 |
| ☐ jjj.pdf | BLACK-AND-WHITE | ONE-SIDED | 1in1 | 1 COPY | 01/14 10:20 |

SELECT ALL | DESELECT | DELETE

701

◁◁ ▷▷ 1/1 ◁ ▷

PRINT | LOGOUT

FIG.9

```
{
    "Duplex": ["Dupex", "One-Side"],
901 ~ "Color": ["Mono", "Color"],
    "Orientation": ["Portrait", "Landscape"],
    ...
    ...
902 ~ "Extension_Setting1": ["Extension_option1", "Extension_option2"],
    "Extension_Setting2": ["Extension_option1", "Extension_option2"],
}
```

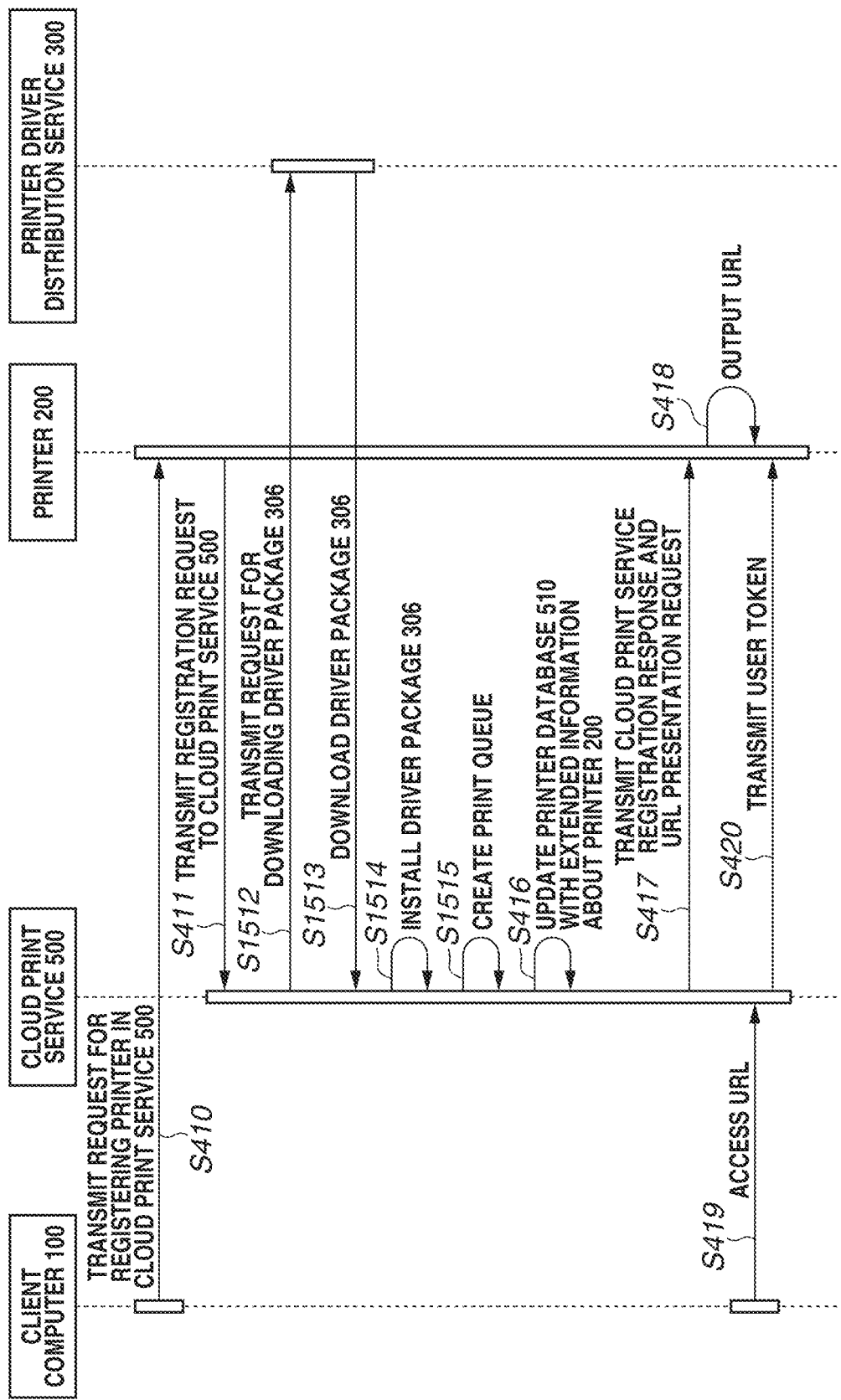

FIG.17A

| PACKAGE NAME | HWID | PACKAGE | APPLICATION IDENTIFIER | EXTENSION |
|---|---|---|---|---|
| A-Driver | iR-ADV_CCCC61B1 | package A | | FALSE |
| B-Driver | iR-ADV_XXXXD80D | package B | | FALSE |
| C-Driver | iR-ADV_CCCC61B1 | package C | AAAAA_AA | TRUE |
| D-Driver | YYYY62B5 | package D | BBBBB_BB | TRUE |

FIG.17B

| DEVICE NAME | HWID | COID | IP ADDRESS | PACKAGE |
|---|---|---|---|---|
| iR-ADV CCCC | iR-ADV_CCCC61B1 | xxyyzz | xxx.xxx.xxx.001 | package A |
| iR-ADV XXXX | iR-ADV_XXXXD80D | xxyyzz | xxx.xxx.xxx.111 | package B |
| AAAA | AAAACF39 | aaabbb | xxx.xxx.xxx.222 | null |
| YYYY | YYYY62B5 | abcabc | xxx.xxx.xxx.234 | null |

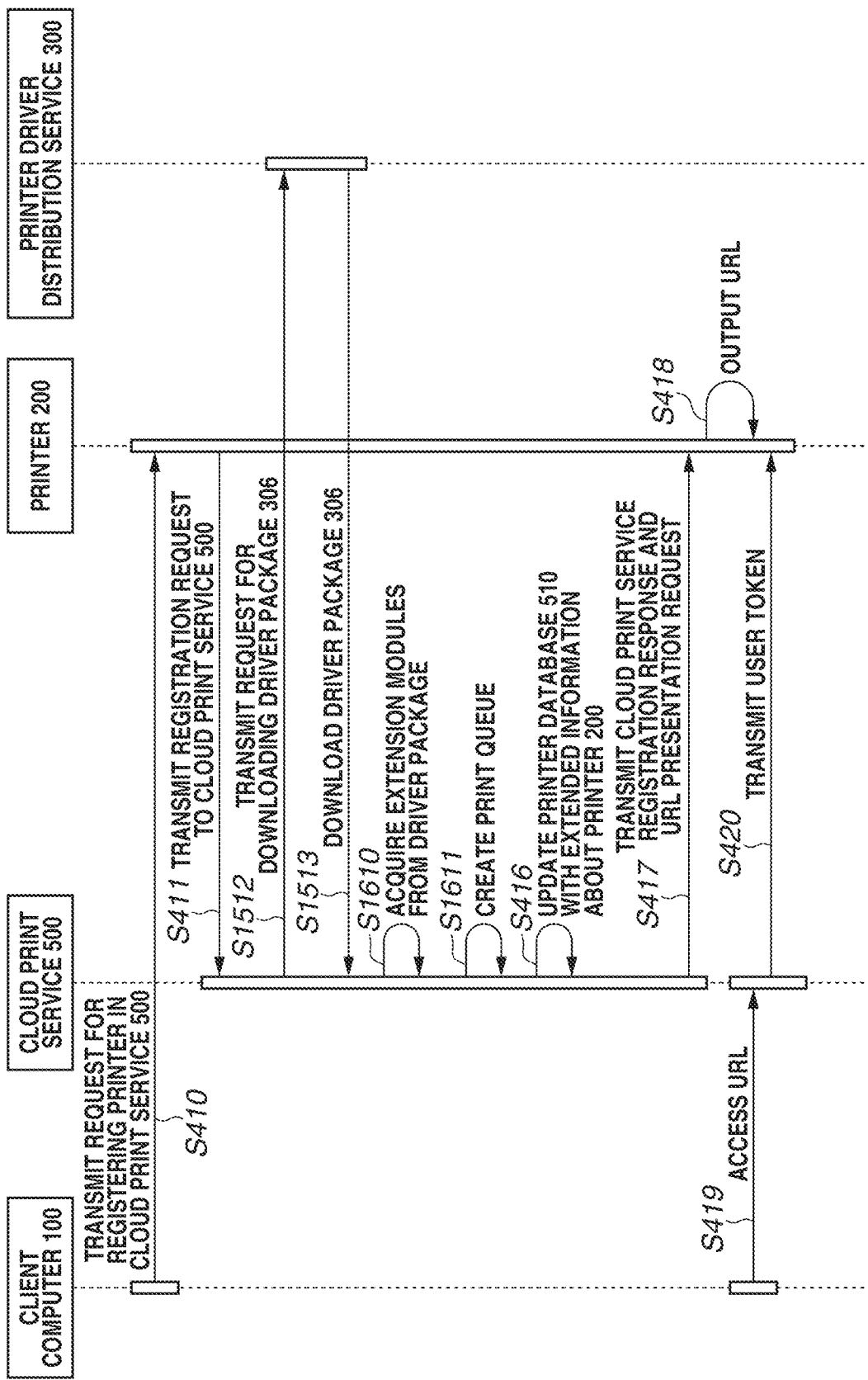

FIG.20

```
<!-- Canon V4 Printer Driver -->
<Filters>
    <Filter dll = "cnnv4_flayout.dll"
        clsid = "{C52AA600-FC9D-493b-B922-4CECDFE41395}"
        name = "Layout Filter">
        <Input guid = "{b8cf8530-5562-47c4-ab67-b1f69ecf961e}" comment = "IID_IXpsDocumentProvider"/>
        <Output guid = "{4368d8a2-4181-4a9f-b295-3d9a38bb9ba0}" comment = "IID_IXpsDocumentConsumer"/>
    </Filter>
    <Filter dll = "cnnv4_faqua.dll"
        clsid = "{685076D6-7DA3-4c44-8B10-1BC763C0502A}"
        name = "Rendering Filter">
        <Input guid = "{b8cf8530-5562-47c4-ab67-b1f69ecf961e}" comment = "IID_IXpsDocumentProvider"/>
        <Output guid = "{65bb7f1b-371e-4571-8ac7-912f510c1a38}" comment = "IID_IPrintWriteStream"/>
    </Filter>
</Filters>
```

2001

2002

INFORMATION PROCESSING APPARATUS, CONTROL METHOD AND PROGRAM THEREFOR, AND SERVER SYSTEM CAPABLE OF COMMUNICATING WITH THE INFORMATION PROCESSING APPARATUS

BACKGROUND

Field of the Disclosure

The present disclosure relates to an information processing apparatus, a control method and a program therefor, and a server system capable of communicating with the information processing apparatus.

Description of the Related Art

A print system is known in which a user registers information about each print apparatus in a cloud print service in advance and transmits print data to the print apparatus via the cloud print service to print. The user accesses the cloud print service from an information processing apparatus, such as a personal computer (PC), selects a print apparatus to be used for printing from among the print apparatuses registered in the cloud print service, and instructs the selected print apparatus to execute printing based on the print data.

The information processing apparatus generates a print job and inputs the generated print job in a print queue on the cloud print service. The print apparatus accesses the cloud print service, acquires the print job spooled in the print queue generated on the cloud print service, and outputs the acquired print job.

Typical examples of the cloud print service include Google Cloud Print® (Japanese Patent Application Laid-Open No. 2013-238924), Microsoft Hybrid Cloud Print®, and uniFLOW Online®.

A module for inputting a print job from a client terminal to the cloud print service is provided as a standard print system by an operating system (OS) of the client terminal.

Heretofore, in printing using a printer driver created by each vendor, each vendor has distributed a module capable of generating print data compatible with functions unique to the vendor to the client computer. Further, the module is used to generate print data in which settings unique to the vendor are reflected. However, the standard print system provided by the OS or the cloud print service described above can generate only the print data in which predetermined standard setting items are reflected. Therefore, the OS or the cloud print service cannot execute printing based on the print data in which settings related to setting items that are unique to the vendor and are different from the predetermined standard setting items are reflected.

SUMMARY

According to embodiments of the present disclosure, an information processing apparatus that communicates with a server system configured to generate print data based on image data received from the information processing apparatus includes a generation unit configured to generate print data based on image data, and a transmission unit configured to transmit the generated print data to the server system. The transmission unit controls the server system not to generate print data based on the image data included in the generated print data.

Further features of the present disclosure will become apparent from the following description of exemplary embodiments with reference to the attached drawings.

BRIEF DESCRIPTION OF THE DRAWINGS

FIG. 3A illustrates an example of functional blocks in a printer driver distribution service according to the first exemplary embodiment. FIG. 3B illustrates an example of functional blocks in a print extension application distribution server according to the present exemplary embodiment. FIG. 3C illustrates an example of functional blocks in a cloud print service according to the present exemplary embodiment.

FIG. 4 illustrates an example of a sequence of registering a printer in the cloud print service according to the first exemplary embodiment.

FIG. 5A is a table illustrating an example of a printer information database held in the cloud print service according to the first exemplary embodiment. FIG. 5B is a table illustrating an example of the printer information database held in the printer driver distribution service according to the present exemplary embodiment. FIG. 5C is a table illustrating the printer information database held in the print extension application distribution server according to the present exemplary embodiment.

FIG. 7 illustrates an example of an operation panel on which a printable job list received from the cloud print service is displayed according to the first exemplary embodiment.

FIG. 9 illustrates an example of printer ability information according to the first exemplary embodiment.

FIG. 16 is a sequence diagram illustrating processing for registering printer information in the cloud print service according to the third exemplary embodiment.

FIG. 17A is a table illustrating an example of information about driver packages managed by the printer driver distribution service according to the third exemplary embodiment. FIG. 17B is a table illustrating an example of information about printers registered in the cloud print service according to the third exemplary embodiment.

FIG. 19 illustrates an example of a sequence of registering a printer in the cloud print service according to the fourth exemplary embodiment.

FIG. 20 illustrates an example of a filter pipeline configuration according to the fourth exemplary embodiment.

DESCRIPTION OF THE EMBODIMENTS

Figure 1:
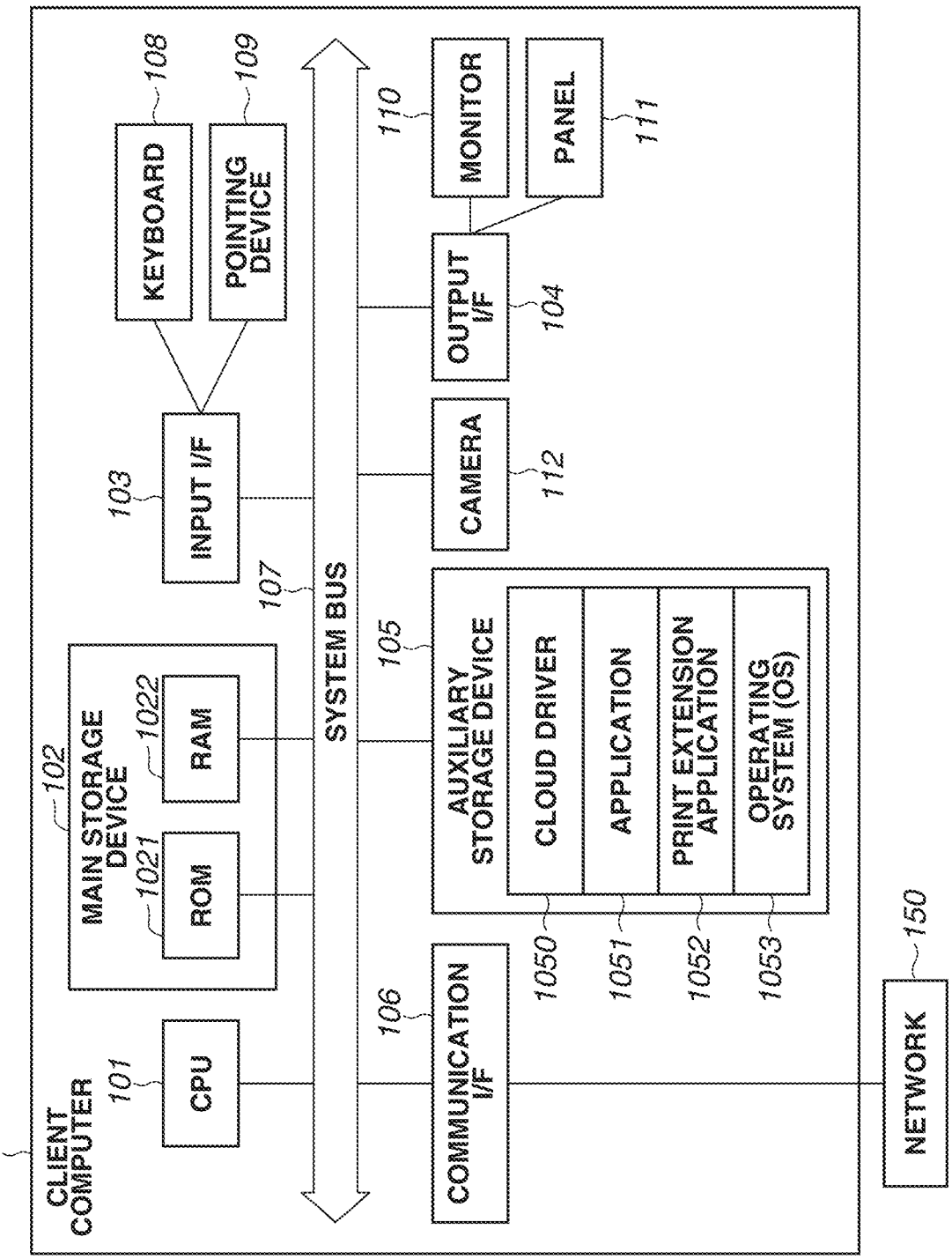
FIG. 1 is a block diagram illustrating an example of a hardware configuration of a client computer according to a first exemplary embodiment.

FIG. 1 is a block diagram illustrating an example of a hardware configuration of a client computer (information processing apparatus) that uses a cloud print service according to a first exemplary embodiment. The hardware configuration will now be described in detail.

A central processing unit (CPU) 101 controls an entire operation of the information processing apparatus based on programs stored in a read-only memory (ROM) 1021 or a random access memory (RAM) 1022 of a main storage device 102, or in an auxiliary storage device 105.

The RAM 1022 is also used as a work area for the CPU 101 to perform various processes. The auxiliary storage device 105 stores a cloud driver 1050, an operating system (OS) 1053, an application 1051, a print extension application 1052, and other data. The main storage device 102 and the auxiliary storage device 105 are hereinafter collectively referred to as a storage device.

Input devices, such as a pointing device 109 as typified by a mouse and a touch panel, and a keyboard 108, are connected to a system bus 107 via an input interface (I/F) 103 and are used for a user to provide a computer with various instructions.

An output I/F 104 is an interface for outputting data to the outside of the information processing apparatus and is used to output data to output devices, such as a monitor 110 and a panel 111. A client computer 100 has an image capturing function and a camera 112 is provided.

The client computer 100 is connected to a printer 200 described below with reference to FIG. 2 and to each system through a network 150 via a communication I/F 106. The system bus 107 is a common data system bus used to exchange data with each I/F or each module.

Figure 2:
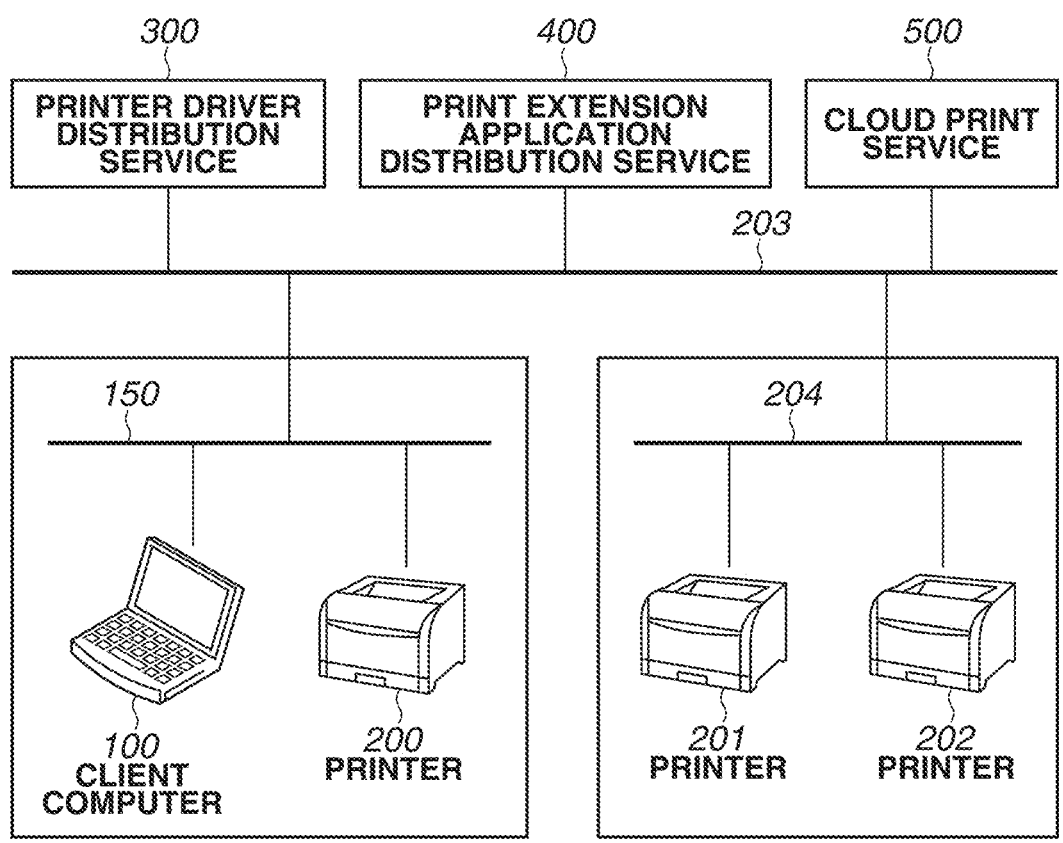
FIG. 2 is a schematic diagram illustrating an example of a network configuration according to the first exemplary embodiment.

FIG. 2 is a schematic diagram illustrating a print system in which a network environment according to the present exemplary embodiment is simplified.

The client computer 100 and the printer 200 are each connected to the network 150. The client computer 100 and the printer 200 are connected to the same intra-network and thus can communicate with each other.

A printer 201 and a printer 202 are each connected to another intranet 204. The network 150 is connected to the intranet 204 via the Internet 203. A printer driver distribution service 300, a print extension application distribution service 400, and a cloud print service 500 are each connected to the Internet 203.

The printer driver distribution service 300 is a server system composed of one or more information processing apparatuses. The printer driver distribution service 300 executes a service for distributing a printer driver to the client computer 100 on a web basis. The client computer 100 searches for the printer 200 based on a protocol, such as Web Services for Devices (WSD) or Internet Printing Protocol (IPP). The client computer 100 acquires and installs the printer driver identified based on printer identification information and model information about the found printer 200 from the printer driver distribution service 300. Each printer driver registered in the printer driver distribution service 300 is updated by a printer vendor. The client computer 100 automatically or manually acquires a printer driver of a new version from the printer driver distribution service 300, and updates the installed printer driver with the acquired printer driver.

The print extension application distribution service 400 is a server system composed of one or more information processing apparatuses that execute a service for distributing an application to be executed by the client computer 100. A print extension application is an application for extending a print function provided by a cloud print service or an OS. In the print function provided by the cloud print service or the OS, only print settings for standard functions, such as a color mode function and a duplex printing function, which can be used in printers of any vendor, can be made. The use of the print extension application makes it possible to use other print functions, such as stapleless binding, poster printing, and saddle stitch binding, which cannot be set in the print function provided by a cloud print service or an OS.

Upon receiving a user operation to request for installation of the print extension application 1052, the client computer 100 accesses the print extension application distribution service 400 and installs the print extension application 1052. If an application identifier is described in an information (Inf) file of the printer driver installed in the client computer 100, the print extension application 1052 is installed. The application identifier is information for identifying an application corresponding to a printer registered in the cloud print service 500 among the applications registered in the print extension application distribution service 400. The client computer 100 accesses the print extension application distribution service 400 and installs the print extension application 1052 corresponding to the identifier described in the Inf file.

The cloud print service 500 is a service constructed on a cloud system as a server system composed of one or more information processing apparatuses. In the present exemplary embodiment, the cloud print service 500 is connectable to each intranet and is also connectable to the client computer 100, the printer 200, the printer 201, and the printer 202 via the Internet 203. In the cloud print service 500, accounts are managed using a user identification (ID) and a password. The client computer 100 accesses the cloud print service 500 using account information input by the user.

In the present exemplary embodiment, assume that the client computer 100 preliminarily stores Uniform Resource Locators (URLs) for the cloud print service 500 and the print extension application distribution service 400. The cloud print service 500 preliminarily stores a URL for the printer driver distribution service 300.

FIG. 3A illustrates an example of functional blocks in the printer driver distribution service 300. The printer driver distribution service 300 is a server system composed of one or more information processing apparatuses having a configuration similar to that of the information processing apparatus illustrated in FIG. 1. A printer driver registration unit 301 and a printer driver response unit 302 are realized by a CPU of each information processing apparatus that constitutes the printer driver distribution service 300 executing a program.

The printer driver distribution service 300 is a service present on the cloud system via the Internet 203. The printer driver distribution service 300 can distribute a package for a printer driver to an external service and the client computer 100. Examples of the package for the printer driver include a printer driver, and a driver extension package.

Upon receiving an instruction to register the package for the printer driver from the external service and the client computer 100, the printer driver registration unit 301 registers the uploaded package in a printer driver database 310. The printer driver registration unit 301 registers, for example, a printer driver distributed by a printer vendor or the like, and a driver extension package for extending the printer driver, in the printer driver database 310.

Upon receiving a request for acquiring a printer driver and an extension package from the external service and the client computer 100, the printer driver response unit 302 acquires the corresponding package from the printer driver database 310 and responds. For example, assume that a request for acquiring the printer driver corresponding to the printer 200 for which a print queue is generated is received from the client computer 100. The printer driver response unit 302 reads out the printer driver corresponding to the printer 200 from the printer driver database 310, and transmits the printer driver to the client computer 100. The printer driver response unit 302 can also receive a request for acquiring a driver extension package for extending the installed printer driver from the client computer 100. In this case, the printer driver response unit 302 reads out the driver extension package corresponding to the printer driver requested from the printer driver database 310, and transmits the driver extension package to the client computer 100.

The printer driver database 310 stores a database described below with reference to FIG. 5B. The printer driver database 310 stores not only printer drivers corresponding to various printers, but also a driver extension package 303.

The driver extension package 303 is an example of the package distributed from the printer driver distribution service 300. The driver extension package 303 includes a driver information unit 304 and a device ability information unit 305. The driver information unit 304 includes information, such as a hardware ID (HWID) for identifying a printer, a compatible ID (COID), information indicating that the package is a driver extension package, and the version of the driver extension package 303. The device ability information unit 305 includes device ability information and confliction information about the corresponding printer 200. The device ability information is, for example, information indicating whether the printer 200 supports color printing or duplex printing. The ability information included in the driver extension package 303 includes not only the above-described ability information, but also information indicating, for example, whether stapleless binding unique to the vendor can be performed, whether saddle stitch binding can be performed, and whether mixed sheet printing, which is printing using various types of sheets, can be performed.

FIG. 3B illustrates an example of functional blocks in the print extension application distribution service 400. An application registration unit 401 and an application response unit 402 are realized by a CPU of one or more information processing apparatuses constituting the print extension application distribution service 400 executing a program.

The print extension application distribution service 400 is a service present on the cloud system via the Internet 203. The print extension application distribution service 400 can distribute the print extension application 1052 to the external service and the client computer 100. The print extension application distribution service 400 can distribute not only the print extension application 1052, but also any application other than the print extension application 1052.

Upon receiving an instruction to register the print extension application 1052 from the external service and the client computer 100, the application registration unit 401 registers the uploaded application in an application database 410.

Upon receiving a request for acquiring the print extension application 1052 from the external service or the client computer 100, the application response unit 402 acquires the corresponding application from the application database 410 and transmits the application to the external service or the client computer 100 that has sent the request.

The application database 410 is a database in which information about a print setting application is registered. The print setting application is distributed by the vendor or the like, and the print setting application receives a registration request from the external service or the client computer 100. The information registered in the application database 410 will be described in detail below with reference to FIG. 5C.

The print extension application 1052 according to the present exemplary embodiment includes a setting file unit 10521 and an execution file unit 10522. The setting file unit 10521 has information, such as application identification information for identifying the print extension application 1052, and the HWID and COID for identifying the corresponding printer 200. The execution file unit 10522 executes the print extension application 1052. The execution file unit 10522 can receive a print setting user interface (UI), processing on a print job upon execution of printing, and a push notification from the external service, and display a print setting screen. In the present exemplary embodiment, the execution file unit 10522 in the print extension application 1052 includes a module for generating page description language (PDL) data based on print data. The execution file unit 10522 generates PDL data in which a print setting made on the print setting screen provided by the print extension application 1052 is reflected. The execution file unit 10522 then transmits the generated PDL data to the cloud print service 500.

The print extension application 1052 generates PDL data, which makes it possible to generate the print data in which the print setting is reflected, even when the print setting is made for an item, such as the IPP, which corresponds to a function other than the standard functions and cannot be interpreted by the cloud print service 500.

FIG. 3C illustrates an example of functional blocks in the cloud print service 500 according to the present exemplary embodiment. Each functional block is realized by a CPU of one or more information processing apparatuses constituting the cloud print service 500 executing a program.

The cloud print service 500 is a service present on the cloud system via the Internet 203, and the cloud print service 500 can provide functions related to printing. In the present exemplary embodiment, the cloud print service 500 includes functions of a printer registration unit 501, a print queue generation unit 502, a printer list generation unit 503, a search response unit 504, and a printer database 510. The cloud print service 500 further includes functions of a print job management unit 505, a print job generation unit 506, and a print job storage area 511. These functions may be provided in another cloud printer service to be operated in cooperation with the cloud print service 500.

A configuration in which the printer 200 is registered in the cloud print service 500 and printing is executed using the printer 200 will be described below by way of example. However, this configuration can be implemented by similar processing even when the printer 200 is replaced with the printer 201 or the printer 202, which is connectable to the cloud print service 500.

The printer registration unit 501 causes the print queue generation unit 502 to generate a print queue, and registers the generated print queue and printer identification information in association with each other in the printer database 510, upon receiving a printer registration instruction from the printer 200. A state where the print queue and printer identification information corresponding to the printer are registered in association with each other is herein described as "a printer is registered". Various attributes may be added to the registered printer. Examples of the various attributes include a location where the printer is placed.

The print queue generation unit 502 generates a print queue on the cloud print service 500 under control of the printer registration unit 501. When the client computer 100 transmits a print instruction to the cloud print service 500, a print job is registered in the print queue generated by the print queue generation unit 502.

The printer list generation unit 503 generates a list of registered printers. The printer list generation unit 503 generates the printer list, for example, when the list of printers registered in the cloud print service 500 is requested from the client computer 100.

The search response unit 504 returns information about the registered printers to the client computer 100 based on a printer search for the cloud print service 500 from the client computer 100. The search response unit 504 delivers the search result to the printer list generation unit 503, and causes the printer list generation unit 503 to generate a printer list. The search response unit 504 returns the printer list generated by the printer list generation unit 503 is to the client computer 100.

The print job management unit 505 receives image data and a print setting from the client computer 100, and transmits a print job generated by the print job generation unit 506 to the printer 200. The print job management unit 505 stores the print job generated by the print job generation unit 506 in the print job storage area 511.

The printer database 510 is a database in which information about the printers registered in the cloud print service 500 is stored. Contents stored in the printer database 510 will be described below with reference to FIG. 5A.

Processing for registering the printer 200 in the cloud print service 500 will now be described.

FIG. 4 is a sequence diagram illustrating processing for registering the printer 200 in the cloud print service 500 according to the present exemplary embodiment. In the present exemplary embodiment, the client computer 100 accesses the printer 200 and operates the printer 200 to transmit a request for registering the printer 200 to the cloud print service 500.

The printer 200 supports a cloud print function (function for receiving a print job from the cloud print service and executing printing) and a web UI function for operating the printer 200 from the client computer 100. The web UI function is a function for generating a UI and releasing the UI on a network. The client computer 100 supports a cloud print client function (function for transmitting a file to the cloud print service) and a web UI client function for operating a web UI (e.g., a web browser). The cloud print service 500 represents a cloud print service on the Internet 203.

The user opens the web UI of the printer 200 by using the web UI client function of the client computer 100, and selects a button for registering the printer 200 in the cloud print service 500 on the web UI. When the button is selected, in step S410, the client computer 100 transmits, to the printer 200, a request for registering the printer 200 in the cloud print service 500.

Upon receiving the request for registering the printer 200 in the cloud print service 500 in step S410, in step S411, the printer 200 transmits, to the cloud print service 500, the request for registering the printer 200 in the cloud print service 500. In the present exemplary embodiment, the request for registering the printer 200 in the cloud print service 500 is thus transmitted from the web UI client function of the client computer 100. This request can also be transmitted by operating an input device, such as a panel, which is included in the printer 200. In this case, the request is not transmitted from the client computer 100, and the printer 200 transmits the printer registration request to the cloud print service 500.

In step S411, the printer registration request transmitted to the cloud print service 500 includes information about the printer 200. The information about the printer 200 includes the name of the printer 200, information (HWID) for identifying the model of the printer 200, and the COID for identifying the type of the printer 200, such as an inkjet printer or a laser printer. The information about the printer 200 also includes Internet Protocol (IP) address information and an ability information file related to functions standardized with the IPP or the like.

Upon receiving the registration request in step S411, in step S412, the cloud print service 500 causes the print queue generation unit 502 to create a print queue for transmitting a print job to the printer 200. The printer registration unit 501 registers printer information and ability information in the printer database 510, and generates a record on the printer for which the registration request is made. Further, the print queue generation unit 502 generates a print queue. The print queue is created using the received information about the printer 200, such as the name of the printer 200 (device name), the HWID and COID for identifying the model of the printer 200, and the IP address of the printer 200.

In step S413, the cloud print service 500 transmits a request for downloading the driver extension package 303 to the printer driver distribution service 300. This request is a request for receiving the driver extension package 303 corresponding to the printer registered in the cloud print service 500. The cloud print service 500 transmits the request for downloading the driver extension package 303 and the HWID and COID for identifying the printer 200 to the printer driver distribution service 300.

In step S414, the printer driver distribution service 300 transmits the corresponding driver extension package 303 to the cloud print service 500 based on the received HWID and COID. The printer driver distribution service 300 identifies the driver extension package, which matches the received HWID and for which an extension flag for the driver extension package indicates "TRUE", based on the printer driver database 310 illustrated in FIG. 5B. If the driver extension package, which matches the received HWID and for which the extension flag indicates "TRUE", cannot be identified, the printer driver distribution service 300 identifies the driver extension package, which matches the received COID and for which the extension flag indicates "TRUE". The printer driver distribution service 300 then transmits the identified driver extension package to the cloud print service 500. If the driver extension package can be identified based only on the HWID, in step S413, only the HWID may be transmitted to the printer driver distribution service 300.

The printer database will now be described with reference to FIG. 5B. FIG. 5B illustrates an example of the printer driver database 310 held in the printer driver distribution service 300. An item "package name" represents the name of the package acquired from the driver information unit 304 during registration processing. An item "HWID" represents identification information (identification information unique to the model of the printer) used for identifying the model of the printer 200. An item "COID" represents identification information for identifying the category of the printer using the driver. An item "package" represents the name of the package including the driver extension package 303. In the item "package", any information, such as a file path, can be used, as long as the information can be used to identify the driver or driver extension package corresponding to the record. An item "extension" indicates whether the driver extension package 303 is an extension file. If the extension indicates "FALSE", the package is not an extension package, but a printer driver. In contrast, if the extension indicates "TRUE", the package is not a printer driver, but a package for extending the driver. An item "application identifier" represents identification information about an application used to extend the print setting screen using the ability information stored in the driver extension package 303. In the present exemplary embodiment, only the driver extension package 303 includes an application identifier, but the printer driver may also include an application identifier.

The printer driver database 310 illustrated in FIG. 5B is updated by the printer driver registration unit 301. Upon registration of the package in the printer driver database 310, the printer driver registration unit 301 analyzes the driver information unit 304. The printer driver registration unit 301 acquires the package name, the HWID and COID, and information indicating whether the package is a driver extension package, and registers the acquired information together with the driver extension package 303 in the printer driver database 310.

In step S415, the cloud print service 500 analyzes the device ability information unit 305 in the downloaded driver extension package 303, and extends the print queue. The cloud print service 500 acquires the ability information about the printer 200 from the device ability information unit 305 in the driver extension package 303. The cloud print service 500 then updates the printer ability information corresponding to the print queue of the printer information in the printer database 510. In step S415, the cloud print service 500 overwrites the ability information associated with the print queue with the ability information acquired from the driver extension package 303. The cloud print service 500 may add, to the ability information corresponding to the print queue, ability information related to a setting item that is not associated with the print queue in the ability information acquired from the driver extension package 303. Alternatively, the cloud print service 500 may acquire information indicating the hardware configuration of the printer 200 from the printer 200, and may determine the ability information based on the ability information and hardware configuration information included in the driver extension package 303.

By using the above-described processing, the print queue is extended with the device ability information, which is unique to the vendor, for the printer 200 registered in the cloud print service 500. In step S416, the printer database 510 is updated with the extended information about the printer 200. By the above-described processing, the ability information extended by the driver extension package 303 is registered in the printer database 510 as the ability information corresponding to the print queue.

FIG. 5A illustrates an example of the printer database 510 held in the cloud print service 500. An item "device name" represents the name of the printer (device name) acquired from the printer 200 during registration processing. An item "HWID" represents an identifier (identifier unique to the model of the printer) used to identify the model of the printer 200. An item "COID" represents identification information for identifying the category of the printer 200, such as an inkjet printer or a laser beam printer. An item "IP address" represents an IP address of a printer to be connected. An item "package" represents the package name of the driver extension package 303 used to extend the print queue corresponding to the printer. If the print queue is not extended, the item "package" indicates "null". Although not illustrated, device ability information and the like are registered in the database in the format of Javascript Object Notation (JSON). If the printer ability information is extended by the driver extension package 303, the extended ability information is stored. The data format for storing the device ability information is not limited to the JSON, but instead may be any other data format. Printer information and information about the user who can use the printer may be stored in association with each other in the printer database 510 illustrated in FIG. 5A.

FIG. 9 illustrates an example of ability information to be stored in association with a print queue. For example, the ability information is registered in the format of JSON, and each setting represents a function. Each function includes options that can be set in a sequence format.

Standard ability information 901 illustrated in FIG. 9 is defined by the IPP or the like. A setting item "Duplex" relates to a duplex function, and includes, as options, "Duplex" indicating duplex printing and "One-Sided" indicating one-sided printing. A setting item "Color" relates to color printing, and includes, as options, "Mono" indicating black-and-white printing and "Color" indicating color printing. A setting item "Orientation" relates to the orientation of each sheet used for printing, and includes, as options, "Portrait" indicating the portrait orientation and "Landscape" indicating the landscape orientation. The ability information 901 is one of the standard setting items or options defined by the IPP or the like. The ability information 901 can be provided to the cloud print service 500 from the printer 200. The extension of the device ability information using the driver extension package 303 enables the standard setting items defined by the IPP or the like described in the ability information 901 to include options unique to the vendor. For example, when a setting item "Staple" for sheet binding is extended, not only "Staple left top" indicating binding at an upper left location, which is a standard option, but also "Saddle Stitch" indicating saddle stitching can be made.

Ability information 902 is ability information extended by the driver extension package 303, and is, for example, ability information about a setting item unique to the vendor. The ability information 902 includes functions of Extension_Setting1 and Extension_Setting2, and options of Extension_option1 and Extension_option2 for the respective functions. Examples of the extension setting include a setting for stapleless binding, and a setting for mixed sheet printing, which is printing using various types of sheets in one print job. If a mixed sheet printing function is set, a character string indicating mixed sheet printing is input in "Extension_Setting1". In this case, a character string indicating an option for using A3-size and A4-size sheets is input in "Extension_option1", and a character string indicating an option for using B4-size and B5-size sheets is input in "Extension_option2". The print extension application 1052 can provide a print setting screen on which setting items unique to the vendor can be made, by referring to the file illustrated in FIG. 9.

Referring again to FIG. 4, upon completion of registration in the printer database 510, in step S417, the cloud print service 500 transmits a cloud print service registration request response including a registration URL for cloud print registration and a registration URL presentation request to the printer 200.

In step S418, the printer 200 receives the cloud print service registration request response and the registration URL presentation request, and the printer 200 outputs registration URL information. In step S418, the printer 200 displays the URL on the monitor 110, or prints the registration URL information on a sheet, and notifies the user of the registration URL. The printer 200 may also send the registration URL to the client computer 100 via the web UI.

In step S419, the user accesses the cloud print service 500 located at the registration URL presented from the printer 200. In this case, it may be desirable to log in to a cloud account on which the cloud print service 500 can be accessed. It may be desirable for the user to input a user ID and a password, accordingly.

The cloud print service 500 associates the user with the printer 200 based on the registration URL including the cloud account and printer information. Examples of the method for associating the user with the printer 200 include a method of associating printer information with a user token. However, the method is not limited thereto. In step S420, the cloud print service 500 transmits the user token including the information about the cloud print service 500 to the printer 200, and then terminates the processing for registering the printer 200 in the cloud print service 500. The printer 200 accesses the cloud print service 500 using the user token.

Next, processing for generating a print queue for the printer 200 registered in the cloud print service 500 in the client computer 100 and installing the print extension application 1052 will be described.

Figure 6:
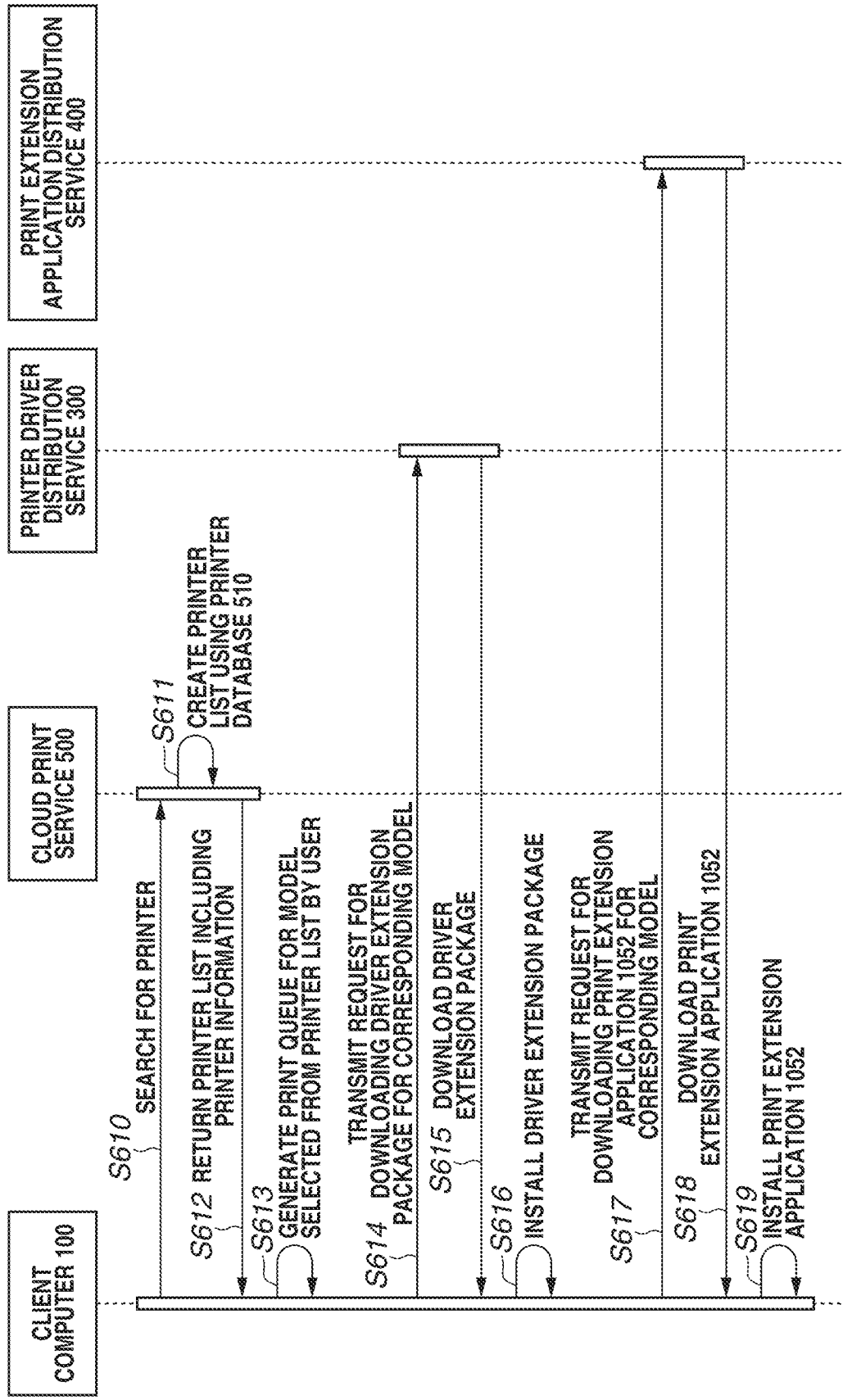
FIG. 6 illustrates an example of a sequence of installing a print setting application in the client computer according to the first exemplary embodiment.

FIG. 6 is a sequence diagram illustrating processing for installing the print extension application 1052 in the client computer 100 according to the present exemplary embodiment.

In the case of outputting data to the printer 200 using the cloud print service, the client computer 100 transmits a print job to the cloud print service 500. Thus, it may be desirable to generate a print queue for transmitting the print job to the cloud print service 500 in the client computer 100.

In the present exemplary embodiment, the print queue for the printer registered in the cloud print service 500 is generated using a printer search function, which is one of the standard functions of the OS 1053. In general, in a case of searching for a printer, a printer that is present on the same intranet becomes a search target. For example, when the client computer 100 searches for a printer in the configuration illustrated in FIG. 2, the printer 200 can be found. However, the printer 201 and the printer 202, which are not present on the intranet, cannot be found. In the present exemplary embodiment, the client computer 100 can access the cloud print service 500. When a printer is registered in the cloud print service 500, the printer registered in the cloud print service 500 can be found by printer search. In the present exemplary embodiment, not only the printer 200 described above, but also the printer 201 and the printer 202 are registered in the cloud print service 500, and thus the printer 201 and the printer 202 can also be found by the printer search function of the OS 1053.

In step S610, the client computer 100 searches for a printer using the printer search function, which is one of the above-described standard functions of the OS 1053. In step S610, the client computer 100 searches for not only a printer present on the same intranet as the intranet to which the client computer 100 belongs, but also printers registered in the cloud print service 500. The client computer 100 accesses the cloud print service 500, and transmits a request for acquiring a list of printers registered in the cloud print service 500 to the cloud print service 500.

Upon receiving the printer search information, the search response unit 504 in the cloud print service 500 presents available printers to the client computer 100. In step S611, the cloud print service 500 therefore generates a printer list including printer information about the printer that the user who has accessed the cloud print service 500 from the client computer 100 can use. The printer information includes the name of the printer (device name), the HWID for identifying the model of the printer, and the IP address of the printer as described above. The printer list generation unit 503 in the cloud print service 500 creates the printer list including printer information by using the information stored in the printer database 510.

In step S612, the cloud print service 500 returns the created print list to the client computer 100. In this case, the cloud print service 500 also transmits information, such as the HWID and COID, which is printer identification information described in the tables illustrated in FIGS. 5A to 5C as printer information included in the printer list. The client computer 100 causes the monitor 110 to display a printer selection screen the user can use to select available printers based on the printer list. The user selects a printer to be used from the presented printer list.

In step S613, the OS 1053 of the client computer 100 installs the cloud driver 1050 used in the cloud print service 500, and generates a print queue for the selected printer. The client computer 100 acquires information about the printer selected by the user from the cloud print service 500, and generates the print queue using the information. The client computer 100 generates the print queue based on the HWID, COID, IP address, and printer ability information acquired from the cloud print service 500. If the cloud driver 1050 is already installed in the client computer 100, the client computer 100 does not install the cloud driver 1050. The client computer 100 generates the print queue using the installed cloud driver 1050 and the printer information acquired from the cloud print service 500.

When the generation of the print queue is successful, in step S614, the OS 1053 of the client computer 100 transmits a request for downloading the driver extension package 303 to the printer driver distribution service 300. The client computer 100 transmits a request for acquiring the HWID, the COID, and the driver extension package to the cloud print service 500. The client computer 100 may transmit only one of the HWID and the COID to the cloud print service 500.

Upon receiving the download request, in step S615, the printer driver distribution service 300 performs download processing on the client computer 100. The printer driver distribution service 300 identifies the package that matches the received HWID from among the driver extension packages registered in the printer driver database 310, and transmits the package to the client computer 100. If the package that matches the received HWID cannot be identified from among the driver extension packages, the printer driver distribution service 300 identifies the driver extension package that matches the received COID. The printer driver distribution service 300 then transmits the identified printer extension package to the client computer 100.

In step S616, the OS 1053 of the client computer 100 installs the driver extension package 303 and extends the ability information corresponding to the print queue generated based on the above-described cloud driver 1050. The client computer 100 updates the ability information corresponding to the print queue with device ability information included in the printer extension package. In other words, the print queue is extended with the device ability, which is unique to the vendor, for the printer 200 registered in the cloud print service 500.

In step S617, the client computer 100 transmits a download request to the print extension application distribution service 400. In this case, the OS 1053 transmits a request for downloading the print extension application 1052 associated with a target printer based on the above-described identifier information about the print extension application 1052. According to the present exemplary embodiment, the identifier information about the print extension application 1052 in the driver extension package 303 and the print extension application 1052 are associated with each other in one-to-one correspondence, in the print extension application distribution service 400.

In the print extension application distribution service 400, metadata may also be stored; the metadata indicates the identifier information about the print extension application 1052 and the information associated with the HWID included in the printer information. In this case, the appropriate print extension application 1052 is downloaded using the metadata.

Upon receiving the download request, in step S618, the print extension application distribution service 400 performs download processing on the client computer 100. The application response unit 402 identifies the application corresponding to the application identifier sent from the client computer 100 based on the application database 410 illustrated in FIG. 5C. The application response unit 402 transmits the identified print extension application to the client computer 100. In step S619, the client computer 100 installs the print extension application 1052.

FIG. 5C illustrates an example of the application database 410 held in the print extension application distribution service 400. An item "application name" represents the name of each application registered in the database including the print extension application 1052. An item "application identifier" represents information for identifying the application including the print extension application 1052. An item "application package" represents a file path in which the application including the print extension application 1052 is stored. In the item "application package", any information, such as the name of a folder in which the application is stored, can be used, as long as the information can be used to identify a package for a registered print extension application.

The application database 410 is updated by the application registration unit 401. The application registration unit 401 analyzes the setting file unit 10521, and acquires an application name and an application identifier. The application registration unit 401 registers the above-described information as well as the print extension application 1052, in the application database 410.

After the installation, the print extension application 1052 is associated with the printer 200 in one-to-one correspondence, in the client computer 100. The printer 200 holds the model information and print setting information about the printer 200, thereby making it possible to present an appropriate print setting UI to the user, accordingly. Alternatively, the print extension application 1052 may communicate with the cloud print service 500 to acquire target model information and print setting information about the target printer, and may provide the UI using the information. Upon completion of installation of the print extension application 1052, the user can use an advanced print setting change function.

In the present exemplary embodiment, the client computer 100 accesses the printer driver distribution service 300 to acquire the driver extension package 303, after the print queue is generated in the client computer 100. The client computer 100 may acquire information about the extended print queue from the cloud print service 500, without extending the print queue on the client computer 100. In this case, the client computer 100 skips steps S614 to S616. Alternatively, the client computer 100 may execute the processing of steps S614 to S616 after acquiring information about the extended print queue from the cloud print service 500.

An operation performed when the client computer 100 executes printing according to the present exemplary embodiment will now be described.

Figure 8A:
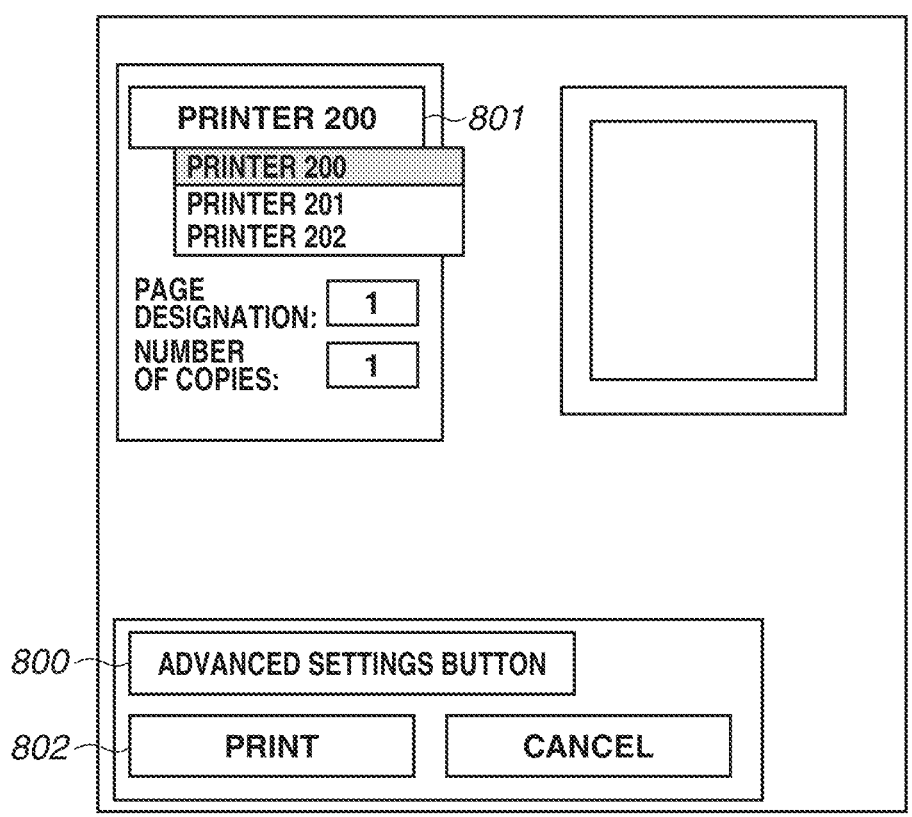
FIG. 8A illustrates an example of a print common dialog box displayed on the client computer according to the first exemplary embodiment.

FIG. 8A illustrates an example of a print common dialog box displayed on the client computer 100 by the OS 1503. An area 801 is an area for selecting a print queue to be used in printing for the printer registered in the cloud print service 500. When the user selects the area 801 in the print common dialog box, a list of print queues registered in the cloud print service 500 is displayed. The user selects the print queue to be used in printing from among the displayed print queues.

An advanced settings button 800 is a button for activating the print extension application 1052. When the user selects the advanced settings button 800, a print setting screen described below with reference to FIG. 8B is displayed.

A "print" button 802 is a button used for the user to instruct print start. When the user selects the "print" button 802, the client computer 100 transmits image data and the current print setting to the cloud print service 500. When printing is instructed in the print common dialog box displayed by the OS 1053, the cloud driver 1050 transmits the image data and the print setting to the cloud print service 500. The print job generation unit 506 in the cloud print service 500 generates PDL data based on the image data and the print setting received from the client computer 100, and stores a job as a print job in the print job storage area 511.

Figure 8B:
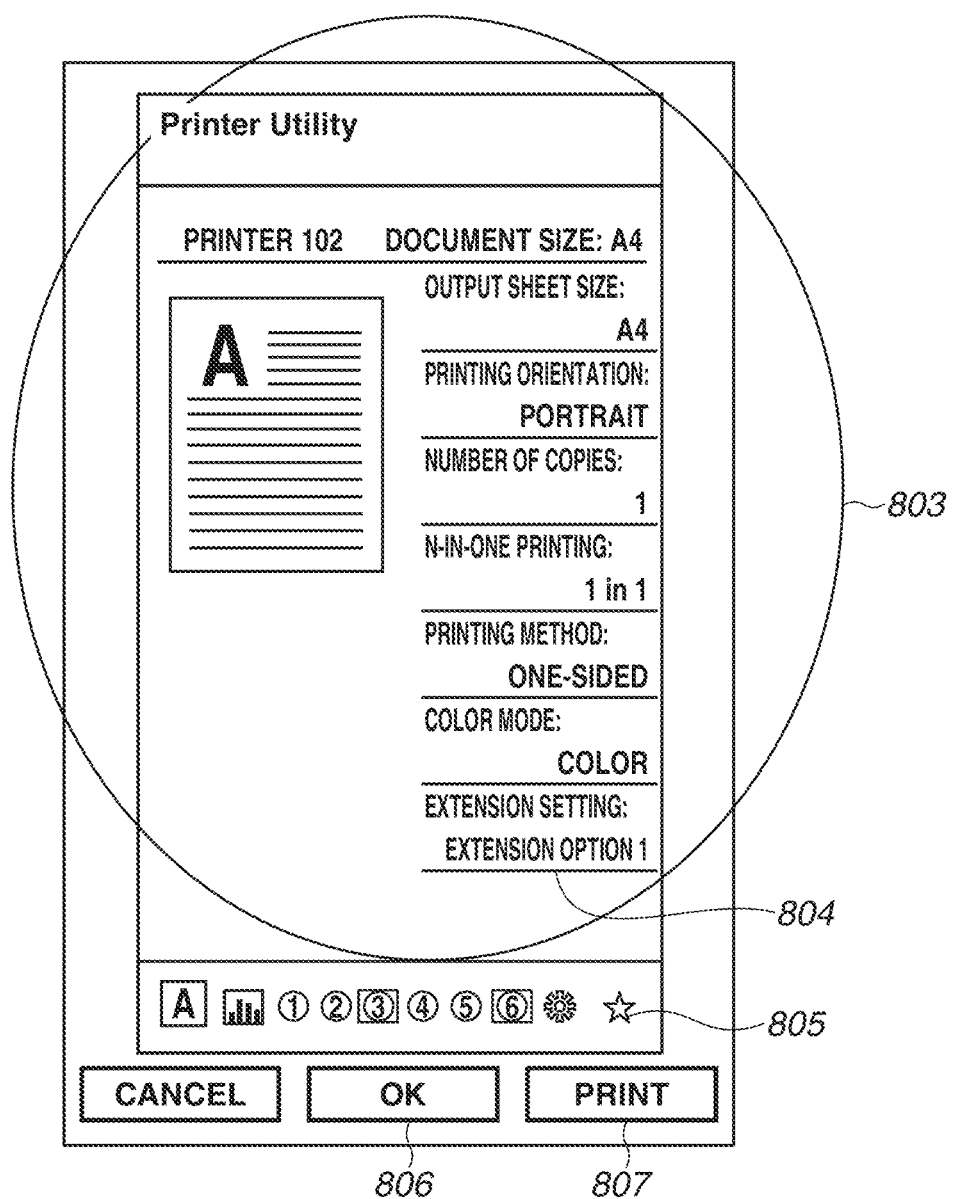
FIG. 8B illustrates an example of a print setting screen according to the present exemplary embodiment.

FIG. 8B illustrates a screen to be displayed on the client computer 100 when the advanced settings button 800 illustrated in FIG. 8A is selected. When the user selects the advanced settings button 800, the OS 1053 identifies the print extension application 1052 corresponding to the selected print queue. The OS 1053 activates the identified print extension application 1052. The activated print extension application 1052 displays the print setting screen illustrated in FIG. 8B.

An area 803 is an area in which the print setting is displayed. In the area 803, setting items unique to the vendor can be set in addition to the sheet orientation, the number of print sheets, and the color mode, which are predetermined standard functions defined by the IPP or the like; the setting items include a setting for bookbinding printing, and a setting for mixed sheet printing, which is printing using various sizes of sheets in one print job.

An extension setting 804 is an operation area generated based on ability information extended by the driver extension package 303. An area 805 is an area for switching the displayed screen and changing a setting item.

An "OK" button 806 is a button used to enter the print setting made on the print setting screen illustrated in FIG. 8B, and to return the screen to the print common dialog box illustrated in FIG. 8A. When the "OK" button 806 is selected, the print setting made on the print setting screen illustrated in FIG. 8B is delivered to the OS 1053.

A "print" button 807 is a button used for the print extension application 1052 to instruct the cloud print service 500 to execute printing. When the "print" button 807 is selected, the print extension application 1052 executes the execution file unit 10522 in the print extension application 1052, and generates PDL data in which the current print setting is reflected. The print extension application 1052 then transmits the generated PDL data and the print setting to the cloud print service 500. In a case where the print extension application 1052 generates PDL data, the cloud print service 500 transmits the PDL data and the print setting to the print apparatus without generating the PDL data.

As described above, in the first exemplary embodiment, PDL data is generated in the print extension application 1052. With this configuration, the PDL data in which the setting made by the print extension application 1052 is reflected can be transmitted to the print apparatus, even if the cloud print service 500 generates the PDL data in which the setting made by the print extension application 1052 is reflected.

Figure 11:
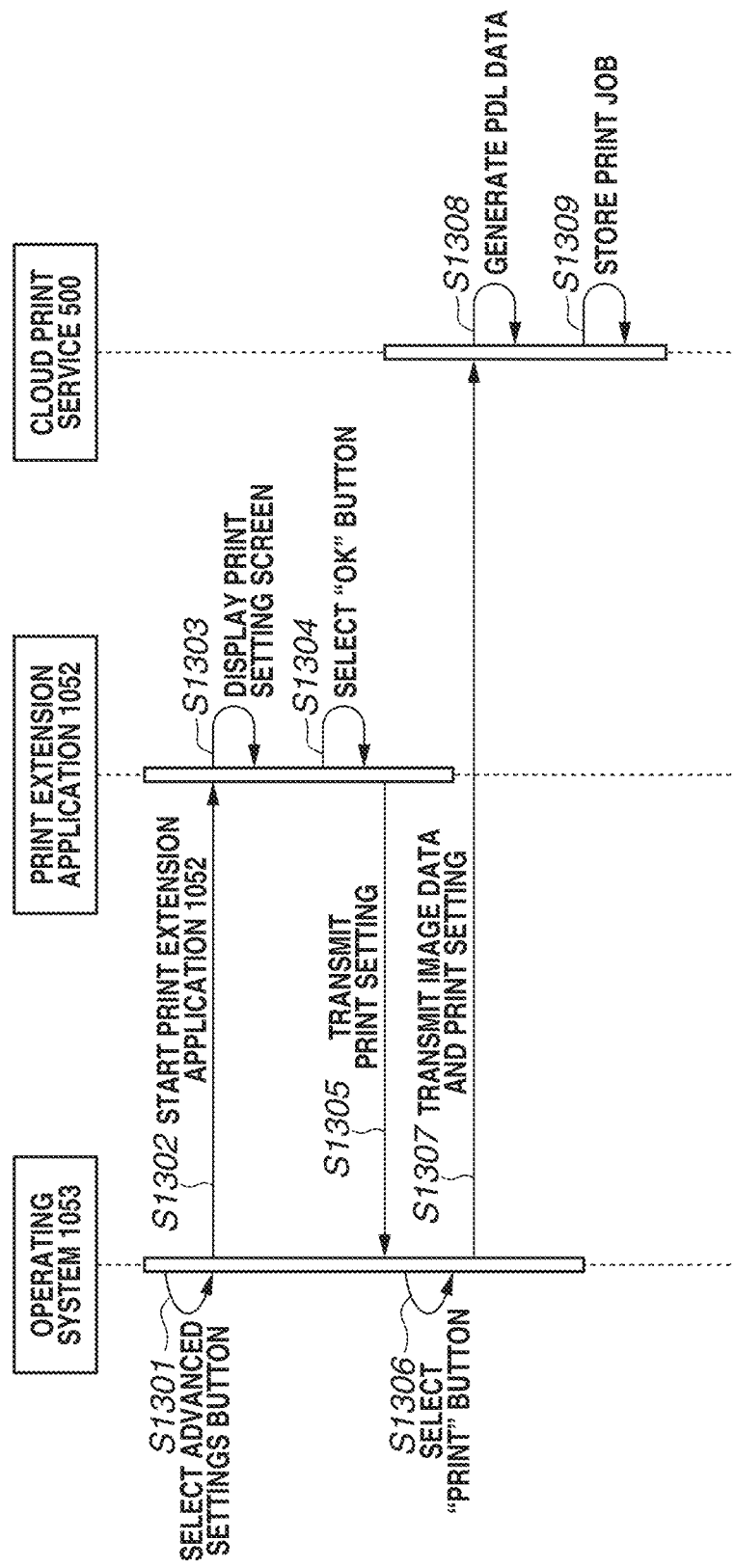
FIG. 11 is a sequence diagram illustrating processing for generating page description language (PDL) data in the cloud print service according to the first exemplary embodiment.

FIG. 11 illustrates processing performed when the cloud print service 500 is instructed to execute printing from the print common dialog box illustrated in FIG. 8A according to the present exemplary embodiment. The processing illustrated in FIG. 11 is started after the common dialog is displayed by the OS 1053.

In step S1301, the OS 1053 receives the selection of the advanced settings button 800. In step S1302, the OS 1053 activates the print extension application 1052 corresponding to the print queue selected in the print common dialog box. In step S1303, the print extension application 1052 displays the print setting screen illustrated in FIG. 8B. The print extension application 1052 receives a print setting change from the user. In step S1304, the print extension application 1052 receives the selection of the "OK" button 806. When the user selects the "OK" button 806, in step S1305, the print extension application 1052 transmits the print setting made on the OS 1053. The OS 1053 receives the print setting from the print extension application 1052, and displays the print common dialog box. In step S1306, the user selects the "print" button 802 in the print common dialog box. In step S1307, the OS 1053 transmits the print setting received from the print extension application 1052 and the image data to be printed, as print data, to the cloud print service 500.

In step S1308, the cloud print service 500 receives the image data and the print setting from the OS 1053 of the client computer 100, and generates PDL data based on the received image data and print setting. In this case, the cloud print service 500 generates the PDL data in which only the print setting supported by the cloud print service 500 is reflected. In step S1309, the cloud print service 500 stores the print job using the generated PDL data as print data in the print job storage area 511.

Figure 12:
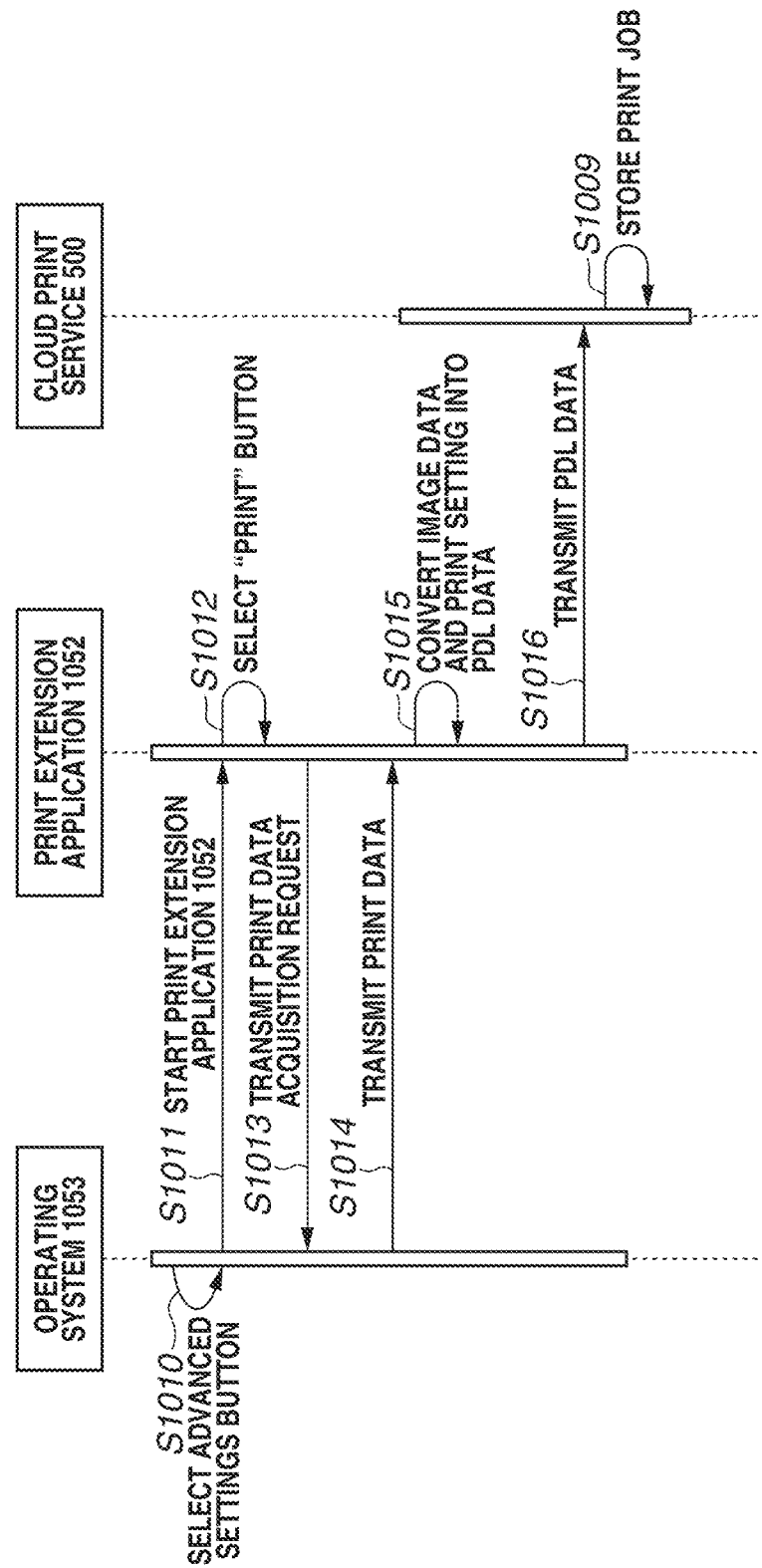
FIG. 12 is a sequence diagram illustrating processing in which PDL data is generated by the print extension application according to the first exemplary embodiment.

As described above, in a case where the cloud print service 500 generates PDL data, only the print setting supported by the cloud print service 500 can be reflected in the PDL data. Examples of the print setting supported by the cloud print service 500 include a setting for color printing or black-and-white printing, and a setting for duplex printing. As for the print setting transmitted in step S1307, the print setting not supported by the cloud print service 500 is not reflected in the PDL data, and thus is not reflected in data output from the printer. In the present exemplary embodiment, in a case where a print setting is made using the print extension application 1052, printing is instructed by the print extension application 1052 as illustrated in FIG. 12 and PDL data is generated by the print extension application 1052. With this configuration, even when a print setting not supported by the cloud print service 500 is made in the print extension application 1052, printing can be executed using the PDL data in which the print setting is reflected. In the present exemplary embodiment, examples of the print setting not supported by the cloud print service include an N-in-one printing setting for printing of a plurality of pages on a sheet, a setting for a saving mode to save recording materials to be used during printing, and a setting for bookbinding or stamping.

In step S1010, the OS 1053 of the client computer 100 receives the selection of the advanced settings button 800 from the user. In step S1011, the OS 1053 activates the print extension application 1052 corresponding to the selected print queue.

In step S1012, the print extension application 1052 receives a setting change from the user, and receives the selection of the "print" button 807. In step S1013, the print extension application 1052 transmits, to the OS 1053, a request for acquiring print data to be printed. In step S1014, the OS 1053 transmits the image data as print data to the print extension application 1052. In step S1015, the print extension application 1052 converts the print setting and the image data received as print data into PDL data unique to the vendor. The PDL data generated by the print extension application 1052 has a data format that can be analyzed by the printer 200, and includes a print command capable of implementing all functions incorporated in the printer 200. Various functions changed by the above-described print setting UI can thereby be converted into the print command, and the print command can be generated as PDL data.

In step S1016, the print extension application 1052 transmits the converted PDL data as print data to the cloud print service 500. The print extension application 1052 may transmit both the PDL data and the print setting as print data to the cloud print service 500. The print extension application 1052 also transmits the PDL data to the cloud print service 500 using a predetermined application programming interface (API).

In step S1017, the cloud print service 500 receives the print data including the PDL data from the print extension application 1052, and the print job management unit 505 registers the received print data including the PDL data, as a print job, in the print job storage area 511.

In a case where the cloud print service 500 receives the PDL data generated by the print extension application 1052, the print job generation unit 506 in the cloud print service 500 does not operate. The print job generation unit 506 performs processing in which, when data of a format that cannot be analyzed by the printer 200 is transmitted to the cloud print service 500, the data is converted into an appropriate form. Thus, there is no need to perform additional conversion processing on the data obtained by converting PDL data generated by the print extension application 1052 into a print job format in the present exemplary embodiment. The cloud print service 500 performs control processing such that the received PDL data is not converted, based on a predetermined API received from the print extension application 1052.

The cloud print service 500 may analyze the data and print setting received from the print extension application 1052, and may determine whether to perform processing for converting the received print data into PDL data. For example, if the print extension application 1052 has transmitted print data, the processing for converting the print data received by the cloud print service 500 into PDL data may be omitted. In contrast, if the OS 1053 has transmitted print data, the processing for converting the received print data into PDL data may be performed.

Thus, the cloud print service 500 includes processing for determining whether to convert the received data. Alternatively, the print extension application 1052 may instruct the cloud print service 500 not to perform the job conversion processing. According to the present exemplary embodiment, it is possible for the cloud print service 500 to manage the PDL data on which the functions incorporated in the printer 200 can be implemented.

In the present exemplary embodiment, a print start instruction using the cloud print service 500 can be issued both on the screen of the print common dialog box provided by the OS 1053 and on the print setting screen provided by the print extension application 1052. Further, the generation of PDL data using the cloud print service 500 and the generation of PDL data in the print extension application 1052 are switched depending on whether printing is instructed from the print common dialog box, or printing is instructed from the print extension application 1052.

When the "print" button 802 in the print common dialog box provided by the OS 1053 is selected, the print extension application 1052 may be automatically activated and the image data may be delivered to the print extension application 1052, and then the print setting screen illustrated in FIG. 8B may be displayed. The user performs advanced settings for printing, as needed, using the print setting screen illustrated in FIG. 8B. When the user selects the "print" button 807, PDL data is generated based on the image data and the print setting acquired by the print extension application 1052, and the generated PDL data and print setting are transmitted to the cloud print service 500. In this case, the print extension application 1052 uses the predetermined API and controls the cloud print service 500 not to generate PDL data. In the above-described example, the advanced settings button 800 illustrated in FIG. 8A and the "OK" button 806 illustrated in FIG. 8B can be omitted. The "print" button 802 can be omitted from the print common dialog box illustrated in FIG. 8A, and printing may be instructed from the print extension application 1052 after the user selects the "advanced settings" button 800 and starts the print extension application 1052. In this case, the PDL data is generated by the print extension application 1052 regardless of the contents of the print setting.

Processing for executing printing based on a print job registered in the cloud print service 500 from the printer 200 will now be described.

When the user logs in to the printer 200, the printer 200 transmits a request for acquiring bibliographic information about the print job registered in the print queue of the cloud print service 500 to the cloud print service 500. The bibliographic information to be acquired in this case is information used for displaying a UI on the printer 200. Examples of the bibliographic information include a file name of image data, the number of print sheets in the color mode, and a date and time when a print job is generated.

The cloud print service 500 generates a printable job list based on the bibliographic information about the print job stored in the print queue. Then, the cloud print service 500 transmits the generated printable job list to the printer 200. Upon receiving the printable job list transmitted by the cloud print service 500, the printer 200 displays the printable job list on an operation panel. FIG. 7 illustrates an example of the operation panel on which the printable job list received from the cloud print service 500 is displayed. Print jobs "aaa.doc" to "jjj.pdf" are included in the cloud print service. The user selects a desired print job from the operation panel and presses a print button 701 to execute printing. The printer 200 that has received a print execution instruction transmits a request for acquiring the print job to the cloud print service 500. This acquisition request includes an ID corresponding to the print job to be acquired, i.e., a print job ID. Printing is realized by executing processing illustrated in FIG. 10 as described below.

Figure 10:
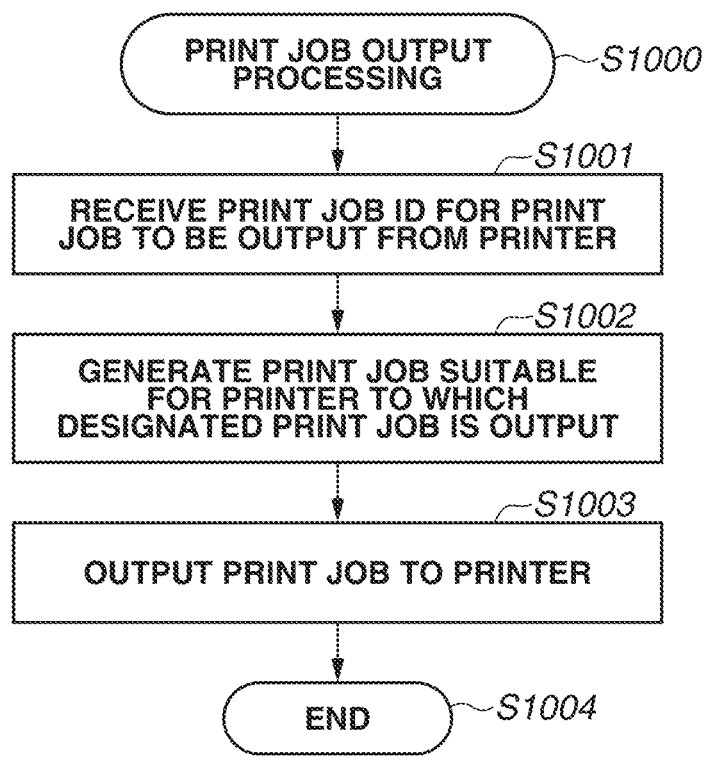
FIG. 10 is a flowchart illustrating an example of print processing in the cloud print service according to the first exemplary embodiment.

FIG. 10 is a flowchart illustrating processing to be performed by the cloud print service 500 when the request for acquiring the print job from the printer 200 is transmitted to the cloud print service 500 according to the present exemplary embodiment. Unless otherwise stated, this processing is performed by each processing unit in the cloud print service 500. In step S1001, the print job management unit 505 receives a print job acquisition request (including a print job ID for a print job to be output) from the printer 200.

The print job management unit 505, which has received the print job acquisition request, identifies the designated print job from the print job storage area 511. In step S1002, the print job management unit 505 delivers the identified print job to the print job generation unit 506, and generates a print job suitable for the printer 200 to which the print job is output.

In step S1003, the print job management unit 505 acquires the generated print job from the print job generation unit 506, and transmits the print job to the printer 200 that has sent the printing request.

In the present exemplary embodiment, the user operates the printer 200, and the printer 200 acquires the selected print job from the cloud print service 500. The printer 200 may periodically access the cloud print service 500 and acquire, from the cloud print service 500, the print job managed in association with the print queue corresponding to the printer 200.

By using the above-described processing, the print job registered in the cloud print service 500 is executed.

With the configuration described above, even when a print setting that is not supported by the cloud print service 500 is made in the client computer 100, the print data in which the print setting is reflected can be transmitted to the print apparatus.

In the first exemplary embodiment, the print extension application 1052 in the client computer 100 converts the print data into print data conforming to the print apparatus. Depending on the specifications of the OS 1053, this processing cannot be implemented in an environment in which the print extension application 1052 cannot be installed. A second exemplary embodiment illustrates a method for implementing all functions incorporated in the printer 200 even in a case where the print extension application 1052 is not present.

The second exemplary embodiment illustrates a case where the cloud print service 500 receives print data from the client computer 100 and an external server system generates PDL data corresponding to the print apparatus. According to the present exemplary embodiment, the print data that conforms to the print apparatus can be generated even in a case where the client computer 100 or the print extension application 1052 cannot generate the print data that conforms to the print apparatus to which the print data is transmitted.

A hardware configuration of the client computer 100 is similar to that of the first exemplary embodiment, and thus the description thereof is omitted.

Figure 14:
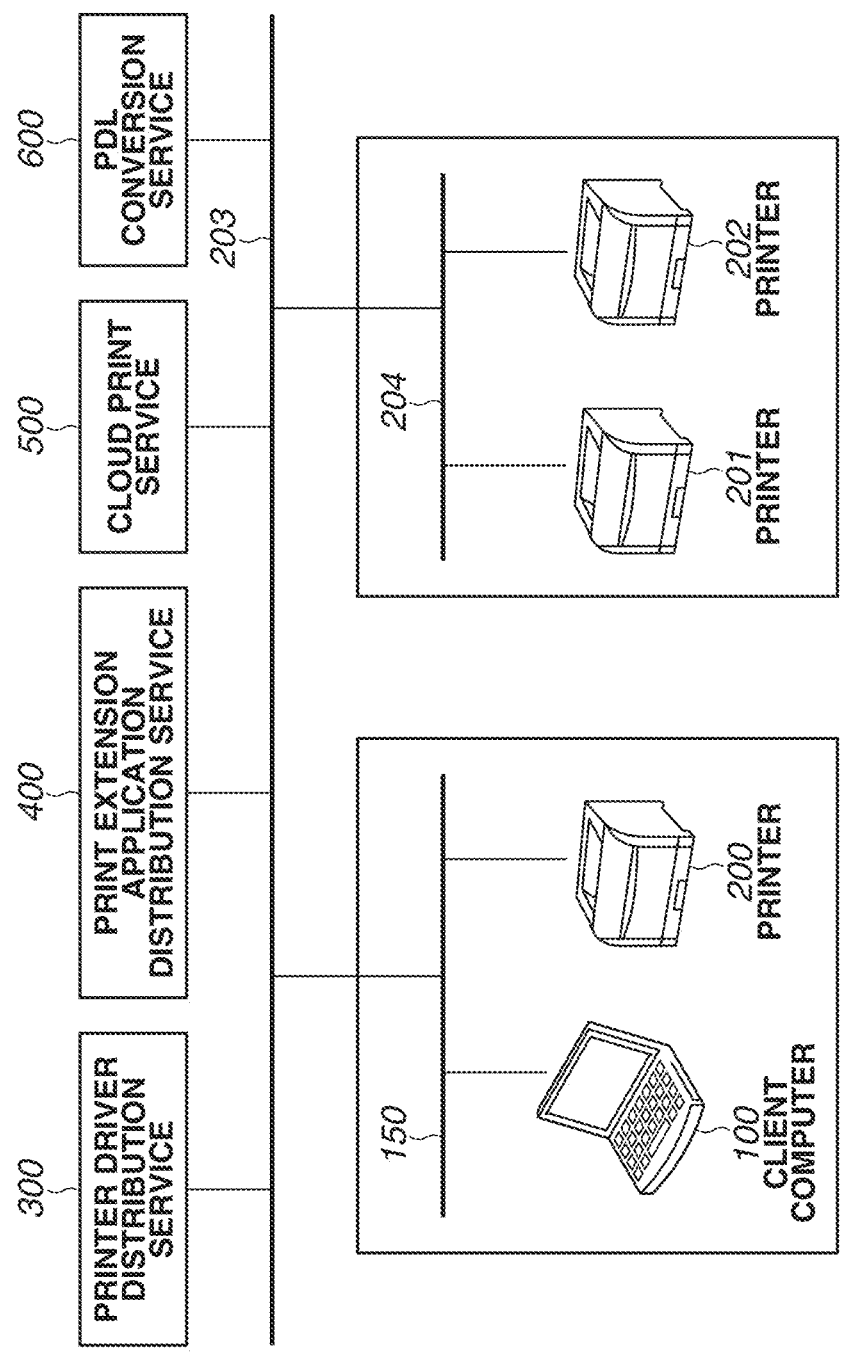
FIG. 14 is a block diagram illustrating an example of a network configuration according to the second exemplary embodiment.

An example of a network configuration according to the present exemplary embodiment will be described with reference to FIG. 14. Components illustrated in FIG. 14 that are similar to those of the first exemplary embodiment are denoted by the same reference numerals, and only components different from those of the first exemplary embodiment will be described.

A PDL conversion service 600 represents a service for converting data into PDL data including a print command capable of implementing all functions of the printer 200 that can be analyzed by the printer 200. The PDL conversion service 600 may be implemented by a module to be registered in an extension area prepared in the cloud print service 500, or may be provided as another cloud service to be operated in cooperation with the cloud print service 500. The PDL conversion service 600 is set as a transmission destination in the cloud print service 500, thereby making it possible to transmit data to the PDL conversion service 600 after the print data is received by the cloud print service 500.

In the present exemplary embodiment, the registration of the printer 200, the generation of a print queue, and the printing instruction made by the user are the same as those described in the first exemplary embodiment, and thus the descriptions thereof are omitted. The description below will start from the point when a user sends a print instruction to transmit print data to the cloud print service 500.

The first exemplary embodiment has been described above assuming that the print instruction can be issued on both the screen of the print common dialog box and the print setting screen provided by the print extension application. If the print instruction is issued on the print common dialog box, the OS 1053 transmits the print data to the cloud print service 500. If the print instruction is issued on the screen provided by the print extension application, the print extension application 1052 transmits the print data to the cloud print service 500. In the present exemplary embodiment, the OS 1053 transmits print data to the cloud print service 500, regardless of which one of the screens is used to issue the print instruction.

Figure 13:
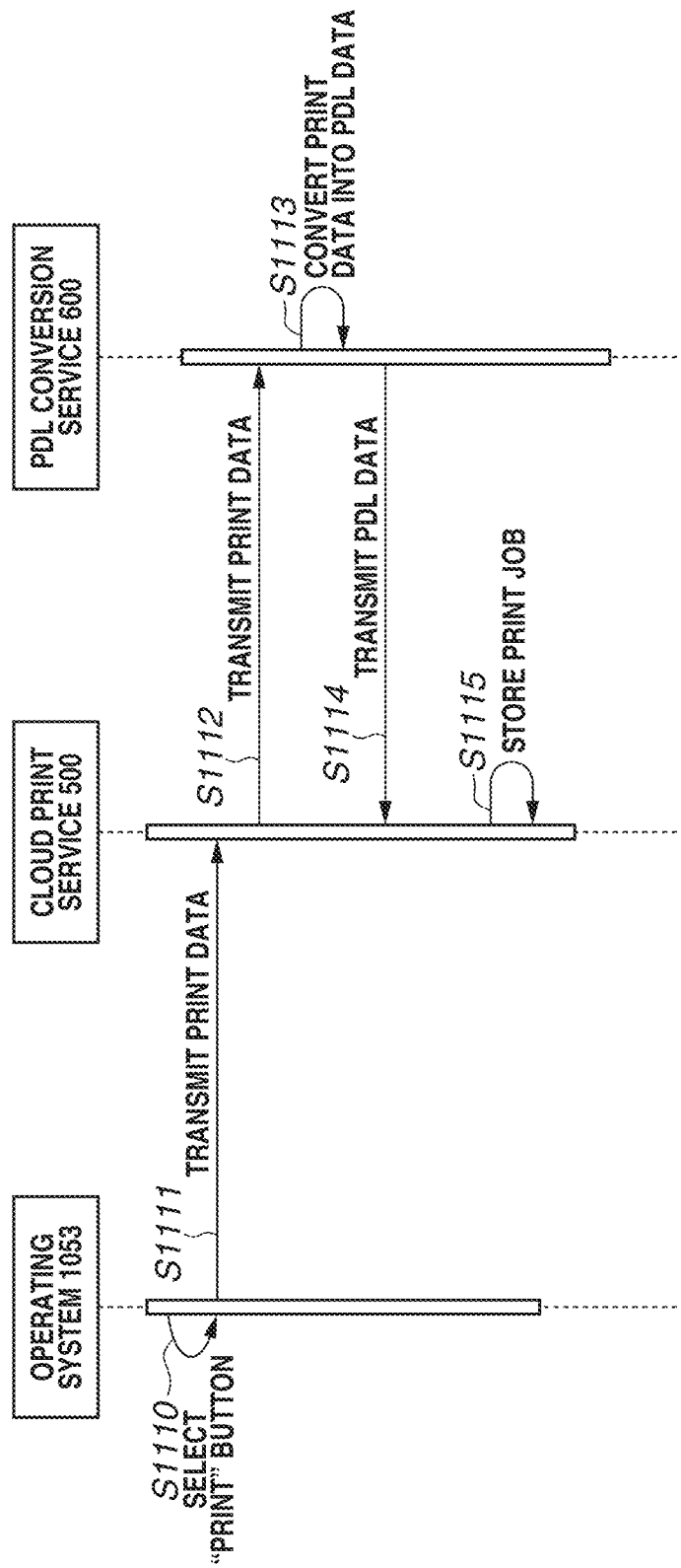
FIG. 13 is a sequence diagram illustrating processing for generating PDL data using a PDL conversion service according to a second exemplary embodiment.

FIG. 13 is a sequence diagram illustrating processing for transmitting print data to the cloud print service 500 and PDL conversion processing using the PDL conversion service 600 according to the present exemplary embodiment.

In step S1110, the OS 1053 of the client computer 100 receives a print instruction from the user. In step S1111, the OS 1053 transmits the print data including image data and a print setting to the cloud print service 500.

Upon receiving the print data, in step S1112, the cloud print service 500 transmits the print data to the PDL conversion service 600, which is preliminarily set as a transmission destination.

Upon receiving the print data from the cloud print service 500, in step S1113, the PDL conversion service 600 converts the print data into PDL data on which all the functions of the printer 200 can be implemented. In step S1114, the PDL conversion service 600 transmits the converted PDL data to the cloud print service 500. In step S1114, the PDL conversion service 600 transmits the PDL data and the print setting in the form of print data to the cloud print service 500. In step S1115, the print job management unit 505 registers, as a print job, the received print data including the PDL data in the print job storage area 511. According to the present exemplary embodiment, the cloud print service 500 can manage the PDL data on which the functions incorporated in the printer 200 can be implemented.

The print job stored in the print job storage area 511 in the cloud print service 500 by the above-described method is read out from the printer, and printing is executed based on the print job in the same manner as in the first exemplary embodiment.

In the present exemplary embodiment, the cloud print service 500 performs PDL conversion processing using the PDL conversion service 600. However, the PDL conversion processing may be implemented at another timing. For example, the client computer 100 may perform the PDL conversion processing by transmitting print data to the PDL conversion service 600 without involving the cloud print service 500. After the PDL conversion processing, the PDL conversion service 600 may transmit the print data including the PDL data and the print setting to the cloud print service 500 and register the print job.

The above-described method makes it possible to implement all functions incorporated in each printer in printing using the standard print system provided by the OS, even under the environment in which the print extension application 1052 cannot be installed.

A third exemplary embodiment illustrates a method for installing a driver package unique to the vendor in the cloud print service 500 and executing processing using a printer driver. The cloud print service 500 in which the driver package is installed converts print data received from the client computer 100 by using the driver. With this configuration, the print data in which the print setting unique to the vendor is reflected can be generated.

Figure 15:
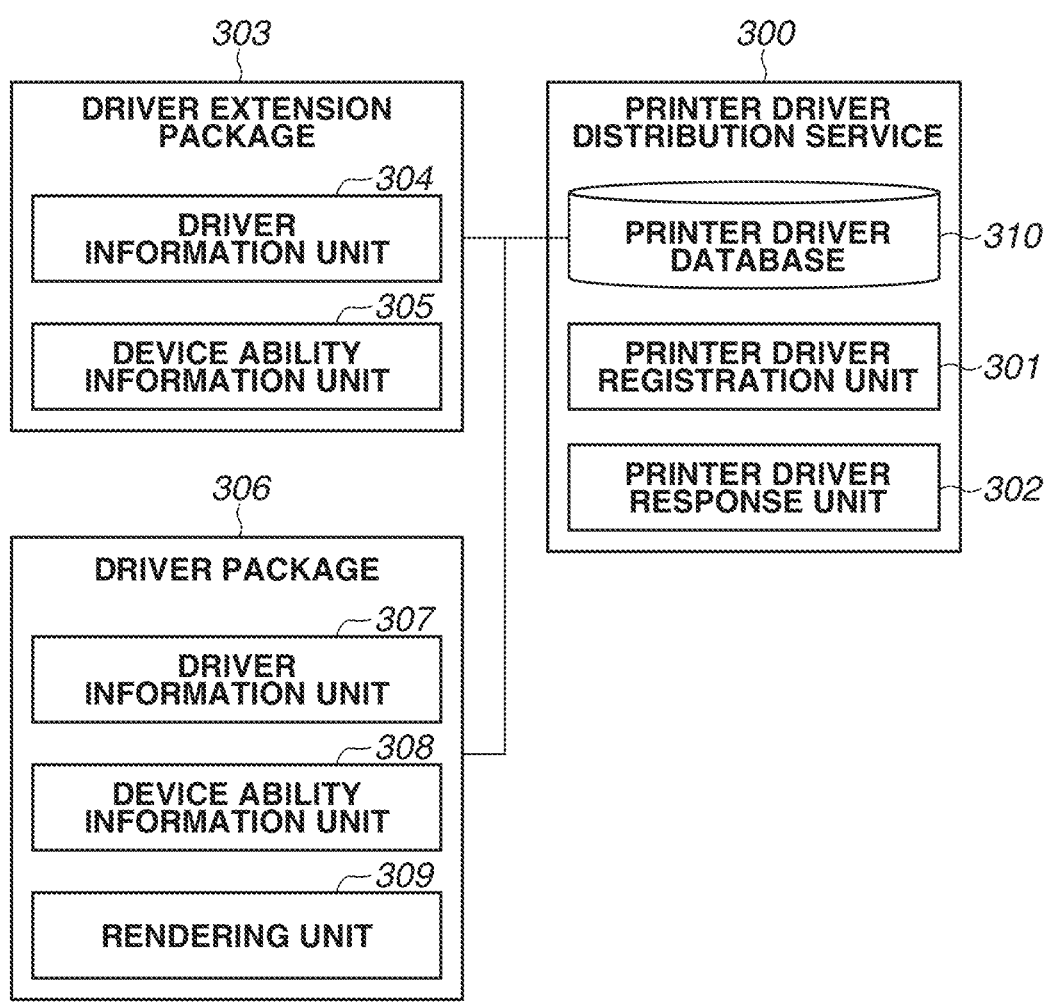
FIG. 15 is a block diagram schematically illustrating the printer driver distribution service according to a third exemplary embodiment.

An example of functional blocks in the printer driver distribution service 300 according to the present exemplary embodiment will now be described with reference to FIG. 15. FIG. 15 is a block diagram to be replaced with the block diagram illustrated in FIG. 3A that is used in the description of the first exemplary embodiment. Components illustrated in FIG. 15 that are similar to those of the first exemplary embodiment are denoted by the same reference numerals, and only components different from those of the first exemplary embodiment will be described.

A driver package 306 is an example of the package distributed from the printer driver distribution service 300. The driver package 306 includes a driver information unit 307, a device ability information unit 308, and a rendering unit 309. The driver information unit 307 includes, similarly to the driver information unit 304, an HWID and COID for identifying each printer, information indicating that the package is a driver extension package, and the version of the driver extension package 303. The device ability information unit 308 includes, similarly to the device ability information unit 305, device ability information and confliction information about the corresponding printer 200. Examples of the device ability information include information indicating whether the printer 200 supports color printing or duplex printing. The ability information included in the driver extension package 303 includes not only the above-described ability information, but also information indicating whether stapleless binding unique to the vendor can be performed, information indicating whether saddle stitch binding can be performed, and information indicating whether mixed sheet printing can be performed. The mixed sheet printing uses various types of sheets.

The rendering unit 309 can convert data, such as Graphics Device Interface (GDI) data, Extensible Markup Language (XML) Paper Specification (XPS) data, Word, Excel, or PowerPoint data into data, such as PDF, PwgRaster, Printer Control Language (PCL), or PDL data unique to a printer vendor.

As described above, the printer driver distribution service 300 includes the driver package 306 and provides the driver package to the cloud print service 500.

FIG. 16 is a timing diagram illustrating a method for installing the printer driver in the cloud service according to the third exemplary embodiment. FIG. 16 illustrates processing to be replaced with the processing illustrated in FIG. 4 that is performed in the first exemplary embodiment. Processes illustrated in FIG. 16 that are similar to those of the first exemplary embodiment are denoted by the same step numbers as those of the first exemplary embodiment, and only different processes will be described.

In the present exemplary embodiment, the client computer 100 accesses the printer 200 and operates the printer 200. The printer 200 thereby transmits a request for registering the printer 200 to the cloud print service 500.

The printer 200 supports the cloud print function and the web UI function for operating the printer 200 from the client computer 100. The cloud print function is a function for receiving a print job from the cloud print service and executing printing. The web UI function is a function for generating a UI and releasing the UI on a network. The client computer 100 supports the cloud print client function and the web UI client function for operating the web UI (e.g., a web browser). The cloud print client function is a function for transmitting a file to the cloud print service. The cloud print service 500 represents a cloud print service on the Internet 203.

In step S1512, the cloud print service 500 transmits a request for downloading the driver package 306 to the printer driver distribution service 300. This request is a request for receiving the driver package 306 corresponding to the printer registered in the cloud print service 500. The cloud print service 500 transmits the request for downloading the driver package 306 and the HWID and COID for identifying the printer 200 to the printer driver distribution service 300. The HWID and COID sent to the printer driver distribution service 300 in step S1512 are the HWID and COID acquired by the cloud print service 500 from the printer 200 in step S411.

In step S1512, the printer driver distribution service 300 transmits the corresponding driver package 306 to the cloud print service 500 based on the received HWID and COID. The printer driver distribution service 300 identifies the printer driver and the driver extension package that match the received HWID from the printer driver database 310 illustrated in FIG. 17A.

Tables illustrated in FIGS. 17A and 17B will now be described. FIG. 17A is a table illustrating information about the driver packages managed by the driver distribution service 300. The table illustrated in FIG. 17A corresponds to the table illustrated in FIG. 4B according to the first exemplary embodiment. FIG. 17B is a table illustrating information about printers registered in the cloud print service 500. The table illustrated in FIG. 17B corresponds to the table illustrated in FIG. 5A according to the first exemplary embodiment.

Assume that, in step S410, the printer indicated by iR-ADV CCCC illustrated in FIG. 17B is added to the cloud print service 500. The cloud print service 500 registers data in the row of iR-ADV CCCC illustrated in FIG. 17B based on the data acquired from the printer 200. The cloud print service 500 sends the HWID to the printer driver distribution service 300. The printer driver distribution service 300 identifies the driver package to be installed in the cloud printer service 500 based on the received HWID. In the table illustrated in FIG. 17A, a plurality of packages that match the HWID of the device iR-ADV CCCC is included. One of the packages has a flag of "TRUE", and the other of the packages has a flag of "FALSE". These flags denote that the driver is extended. The packages for which the flag indicates "TRUE" are not printer drivers, but are packages for extending printer information. In this case, the printer driver distribution service 300 preferentially transmits the printer drivers in which the flag denoting that the driver is extended indicates "FALSE", to the cloud print service 500.

If the printer driver and the driver extension package that match the HWID sent from the cloud print service 500 are not identified, the printer driver distribution service 300 executes the following processing. That is, the printer driver distribution service 300 transmits the printer driver that matches the COID received from the cloud print service 500 to the cloud print service 500. If both the printer driver and the extension package that match the received COID are present, the printer driver distribution service 300 preferentially transmits the printer driver to the cloud print service 500. If the driver extension package can be identified based only on the HWID, in step S413, only the HWID may be transmitted to the printer driver distribution service 300.

In step S1513, the cloud print service 500 downloads the driver package 306 from the printer driver distribution service 300. In step S1514, the downloaded driver package 306 is installed in the cloud print service 500.

In step S1515, the cloud print service 500 causes the print queue generation unit 502 to create a print queue for transmitting a print job to the printer 200. The printer registration unit 501 registers the printer information and the ability information in the printer database 510, and generates a record on the printer for which the registration request is made. The print queue generation unit 502 further generates a print queue. This print queue is created using received information about the printer 200, such as the name of the printer 200 (device name), the HWID and COID for identifying the model of the printer 200, and the IP address of the printer 200. By using the above-described processing, the IP address and the package are registered in the printer database illustrated in FIG. 17B.

The subsequent processing is similar to that of the first exemplary embodiment.

A method for printing using the printer driver installed in the cloud service according to the third exemplary embodiment will now be described. In the present exemplary embodiment, the printer driver installed in the cloud print service 500 generates PDL data. Thus, the present exemplary embodiment will be described with reference to the sequence diagram illustrated in FIG. 11 described above in the first exemplary embodiment. Descriptions of processes similar to those of the first exemplary embodiment are omitted, and only processes different from those of the first exemplary embodiment will be described.

In step S1308, the cloud print service 500 receives image data and a print setting from the OS 1053 of the client computer 100, and generates PDL data based on the received image data and print setting. The cloud print service 500 acquires the device name of the printer used in printing from the print setting received from the OS 1053. The cloud print service 500 identifies the driver corresponding to the printer indicated by the acquired device name with reference to the table illustrated in FIG. 17B. The cloud print service 500 determines whether the identified driver is installed. If the printer driver identified based on the above-described determination is installed in the cloud print service 500, the rendering unit 309 of the identified printer driver generates PDL data. If it is determined that the printer driver corresponding to the acquired device name is not installed in the cloud print service 500, the cloud print service 500 executes the following processing. That is, the cloud print service 500 generates PDL data using a module preliminarily included in the cloud print service 500, without using the driver acquired from the printer driver distribution service 300. Even in a case where the driver is not identified based on the acquired printer name, the cloud print service 500 generates PDL data using a module preliminarily included in the cloud print service 500.

Thereafter, in step S1309, the cloud print service 500 delivers the generated PDL data to the print job generation unit 506, generates a print job using print data, and stores the print job in the print job storage area 511.

As described above, PDL data can be generated using the driver distributed from the printer driver distribution service 300. The printer driver registered in the printer driver distribution service 300 is installed in the cloud print service 500, thereby making it possible to generate the PDL data in which a print setting not supported by the cloud print service 500 is reflected.

In the third exemplary embodiment, the printer driver made by the vendor is installed in the cloud print service 500, thereby generating PDL data using the driver. In a fourth exemplary embodiment, a filter for generating PDL data from XPS data generated by an OS standard driver is installed in the cloud print service 500, thereby generating PDL data.

Figure 18:
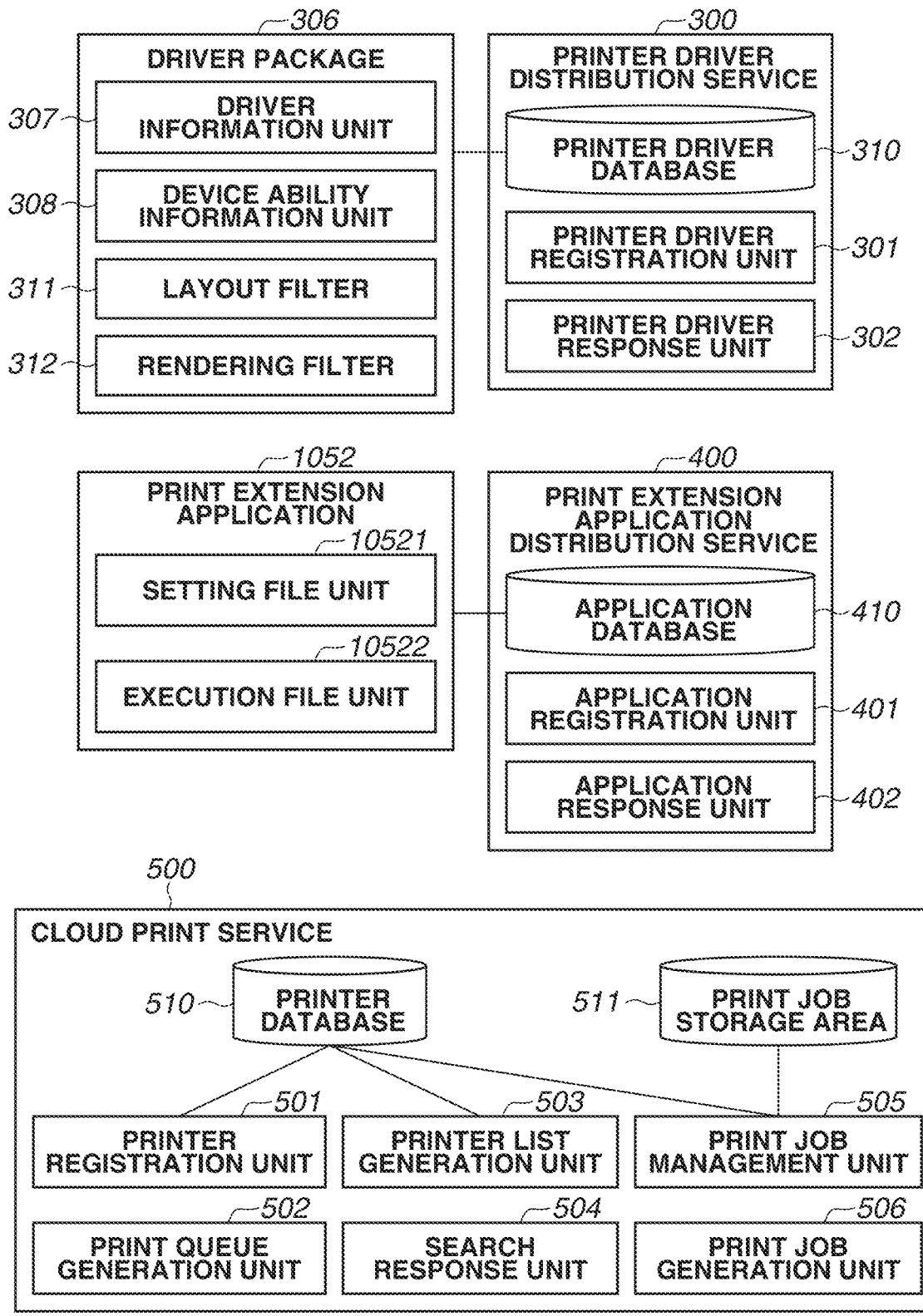
FIG. 18 illustrates an example of functional blocks according to a fourth exemplary embodiment.

An example of functional blocks in the printer driver distribution service 300 according to the fourth exemplary embodiment will now be described with reference to FIG. 18. Components illustrated in FIG. 18 that are similar to those of the first exemplary embodiment are denoted by the same reference numerals, and only components different from those of the first exemplary embodiment will be described.

The driver package 306 is an example of the package distributed from the printer driver distribution service 300. In the present exemplary embodiment, assume that a driver package to be operated in a V4 driver architecture is used as the driver package 306. The V4 driver architecture is a printing structure operated in an XML Paper Specification (XPS) printing path incorporated in Microsoft Windows 8® and subsequent platforms.

The driver package 306 includes the driver information unit 307, the device ability information unit 308, a layout filter 311, and a renderer filter (rendering filter) 312. The driver information unit 307 includes information, such as the HWID and COID for identifying each printer, information indicating that the package is a driver extension package, and the version of the driver extension package 303, similarly to the driver information unit 304. The present exemplary embodiment differs from the third exemplary embodiment in that the driver package 306 includes the layout filter 311 and the renderer filter 312.

The device ability information unit 308 includes device ability information and confliction information about the corresponding printer 200, similarly to the device ability information unit 305 in the driver extension package 303. The device ability information is, for example, information indicating whether the printer 200 supports color printing or duplex printing. The ability information included in the driver extension package 303 includes not only the above-described ability information, but also information indicating whether stapleless binding unique to the vendor can be performed, information indicating whether saddle stitch binding can be performed, and information indicating whether mixed sheet printing can be performed. The mixed sheet printing uses various types of sheets. Further, in the present exemplary embodiment, not only the device ability, print setting information that is unique to the vendor and is completed by processing performed by the driver is included.

The layout filter 311 performs layout related processing, such as changing a magnification, and imposition layout or stamp in bookbinding.

The renderer filter 312 renders XPS data, which is a spool file used for operation in a V4 driver architecture, and converts the XPS data into PDL data.

The layout filter 311 and the renderer filter 312 are filters that are used as a filter pipeline plug-in used in the V4 driver architecture.

FIG. 19 is a timing diagram illustrating a method for installing the printer driver in the cloud service according to the fourth exemplary embodiment. Processes in the FIG. 19 that are similar to those of the first exemplary embodiment are denoted by the same reference numerals, and only components different from those of the first exemplary embodiment will be described.

FIG. 19 is a timing diagram illustrating processing for registering the printer 200 in the cloud print service 500. In the present exemplary embodiment, the client computer 100 access the printer 200 and operates the printer 200, thereby transmitting a request for registering the printer 200 in the cloud print service 500.

The printer 200 supports the cloud print function (function for receiving a print job from the cloud print service and print) and the web UI function for operating the printer 200 from the client computer 100. The web UI function is a function for generating a UI and releasing the UI on a network. The client computer 100 supports the cloud print client function (function for transmitting a file to the cloud print service) and the web UI client (e.g., a web browser) for operating the web UI. The cloud print service 500 represents a cloud print service on the Internet 203.

In step S1512, the cloud print service 500 transmits a request for downloading the drier package 306 to the printer driver distribution service 300. This request is a request for receiving the driver package 306 corresponding to the printer registered in the cloud print service 500. The cloud print service 500 transmits the request for downloading the driver package 306 and the HWID and COID for identifying the printer 200 to the printer driver distribution service 300.

In step S1512, the printer driver distribution service 300 transmits the corresponding driver package 306 to the cloud print service 500 based on the received HWID and COID. The printer driver distribution service 300 identifies the printer driver and the driver extension package that match the received HWID from the printer driver database 310 illustrated in FIG. 17A. As indicated by the device iR-ADV CCCC illustrated in FIG. 17B, if both the printer driver (extension flag indicates "FALSE") and the extension package (extension flag indicates "TRUE") that match the HWID are present at the same time in the printer driver database, the printer driver is preferentially transmitted.

If the printer driver and the driver extension package that match the HWID are not identified, the printer driver distribution service 300 identifies the printer driver and the driver package 306 that match the received COID. If the printer driver and the extension package that match the COID are present, the printer driver is preferentially transmitted. The printer driver distribution service 300 then transmits the identified printer driver and the driver package 306 to the cloud print service 500. If the driver extension package can be identified based only on the HWID, only the HWID may be transmitted to the printer driver distribution service 300 in step S413.

In step S1513, the cloud print service 500 downloads the driver package 306 from the cloud print service 500. In step S1610, the cloud print service 500 acquires the driver information unit 307, the device ability information unit 308, the layout filter 311, and the renderer filter 312, which are included in the driver package 306.

In step S1611, the cloud print service 500 registers the OS standard driver installed in the OS within the cloud service, the acquired driver package 306, and the identification information about the printer 200 for which the registration request is made, in association with each other.

Specifically, the cloud print service 500 performs update processing for associating the device ability information unit 308 used in the V4 driver architecture with the filter used as filter pipeline plug-in. The cloud print service 500 adds the acquired information about the device ability information unit 308 as additional information to basic settings included in the OS standard driver. The user can thereby add print setting information unique to the vendor, when printing with the cloud print service 500.

The cloud print service 500 then associates the filter information to which various processes can be added using the print setting information extended by the device ability information unit 308 with the identification information about the printer 200 and the OS standard driver. The filter pipeline plug-in is referred to as a filter. In the present exemplary embodiment, various extension processes can be performed based on the print setting information unique to the vendor by associating the layout filter 311 and the renderer filter 312. The filter pipeline plug-in is defined by a file of an XML format namely a filter pipeline configuration as illustrated in FIG. 20. In the present exemplary embodiment, as described above, a layout filter definition unit 2001 and a renderer filter definition unit 2002 are described. The OS standard driver reads these definition files, thereby completing the association processing. This processing makes it possible to extend the OS standard driver, and execute printing by appropriately processing the print setting information unique to the vendor.

After the above-described processing, the following processing is executed when the client computer 100 selects the print queue corresponding to the printer 200 generated in the cloud print service 500 and instructs printing.

The cloud print service 500 receives image data and a print setting from the client computer 100. The OS standard driver in the cloud print service 500 generates XPS data based on the received image data and print setting. The generated XPS data is input to the layout filter 311 associated with the printer 200. The layout filter 311 interprets the input XPS data and generates XPS data in which the layout set by the print setting is reflected. The layout filter 311 then delivers the generated XPS data to the renderer filter 312. The renderer filter 312 generates data that can be interpreted by the printer 200 based on the XPS file. The above-described configuration enables printing using the driver package 306 acquired from the printer driver distribution service 300.

As described above in the fourth exemplary embodiment, some of the modules in the printer driver registered in the printer driver distribution service 300 are used and the filter for the V4 driver architecture is used. In the fourth exemplary embodiment, the print data in which a print setting that cannot be made in the general-purpose cloud print service 500 is reflected can be transmitted to the print apparatus, accordingly.

Embodiments of the present disclosure can also be implemented by executing the following processing. That is, software (program) for implementing functions according to the above-described exemplary embodiments is supplied to a system or apparatus via a network or various storage media, and a computer (or a CPU, a micro processing unit (MPU), etc.) of the system or apparatus reads out and executes a program code. In this case, the computer program and a storage medium storing the computer program constitute an embodiments of the present disclosure.

Even in a standard print system provided by an OS, functions that are unique to a vendor and are incorporated in a printer can be implemented by using a method for converting data into PDL data unique to the vendor.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2020-015842, filed Jan. 31, 2020, No. 2020-176781, filed Oct. 21, 2020, and No. 2021-004373, filed Jan. 14, 2021, which are hereby incorporated by reference herein in their entirety.

What is claimed is:

1. An information processing apparatus communicating with a server system capable of converting print data received from the information processing apparatus into first PDL data and transmitting the converted first PDL data to a printing apparatus, the information processing apparatus comprising a controller configured to:
   convert print data into second PDL data;
   transmit the converted second PDL data to the server system with information related to conversion of the second PDL data, wherein the server system does not convert the second PDL data in accordance with the information; and
   transmit print data to the server system without converting the transmitted print data to the second PDL data, wherein the information is not transmitted to the server system even if the print data is transmitted to the server system.

2. The information processing apparatus according to claim 1, wherein the first PDL data is data to which a print setting value supported by the server system is applied and another print setting value not supported by the server system is not applied.

3. The information processing apparatus according to claim 2, wherein the second PDL data is data to which said another print setting value is applied.

4. The information processing apparatus according to claim 2, wherein the controller is further configured to:
   receive a first user instruction for transmitting the print data to the server system; and
   receive a second user instruction for transmitting the second PDL data to the server system.

5. The information processing apparatus according to claim 1, wherein the information includes a command of an application programming interface that causes the sever system to transmit the second PDL data that has been received from the information processing apparatus to the printing apparatus without converting the second PDL data.

6. The information processing apparatus according to claim 5, wherein the print data is transmitted to the server system based on a predetermined protocol.

7. A server system comprising:
   a controller configured to:
   receive print data from an information processing apparatus;
   convert the received print data into first PDL data;
   transmit the first PDL data to a printing apparatus;
   receive second PDL data from the information processing apparatus with information related to conversion of the second PDL data, wherein the server system does not convert the received second PDL data in accordance with the received information; and
   transmit the received second PDL data to the printing apparatus.

8. The server system according to claim 7, wherein the first PDL data is data to which a print setting value supported by the server system is applied and another print setting value not supported by the server system is not applied and the second PDL data is data to which said another print setting value is applied.

9. The server system according to claim 7, wherein the controller is further configured to:
   receive the print data in accordance with a predetermined protocol; and
   receive the second PDL data by using an application programming interface (API), wherein the information includes a command of the API that causes the server system to transmit the second PDL data that has been received from the information processing apparatus to the printing apparatus without converting the second PDL data.

10. A control method for an information processing apparatus communicating with a server system capable of converting print data received from the information processing apparatus into first PDL data and transmitting the converted first PDL data to a printing apparatus, the control method comprising:
    converting print data into second PDL data;
    transmitting the converted second PDL data to the server system with information indicating that the server transmits the second PDL data to the printing apparatus without converting the second PDL data, wherein the server system does not convert the second PDL data in accordance with the information; and
    transmitting print data to the server system without converting the transmitted print data to the second PDL data, wherein the information is not transmitted to the server system even if the print data is transmitted to the server system.

11. The information processing apparatus according to claim 4, wherein the first user instruction is received via a first print setting screen provided by an operating system of the information processing apparatus and the second user instruction is received via a second print setting screen provided by a print setting application installed on the information processing apparatus.

12. The information processing apparatus according to claim 1, wherein the data transmitted with the second PDL is data indicating that the server system does not convert the transmitted second PDL data.

* * * * *